United States Patent
Phillips et al.

(10) Patent No.: US 12,552,249 B2
(45) Date of Patent: Feb. 17, 2026

(54) ADVANCED GATED SHIFTER FOR VEHICLE MANUAL AND AUTOMATIC TRANSMISSION EMULATION

(71) Applicant: Adeia Guides Inc., San Jose, CA (US)

(72) Inventors: Christopher Phillips, Hartwell, GA (US); Charles Dasher, Lawrenceville, GA (US)

(73) Assignee: Adeia Guides Inc., San Jose, CA (US)

( * ) Notice: Subject to any disclaimer, the term of this patent is extended or adjusted under 35 U.S.C. 154(b) by 147 days.

(21) Appl. No.: 18/621,707

(22) Filed: Mar. 29, 2024

(65) Prior Publication Data

US 2025/0303856 A1    Oct. 2, 2025

(51) Int. Cl.
*B60K 26/02* (2006.01)
*B60K 35/21* (2024.01)
*B60K 35/25* (2024.01)
*B60K 35/28* (2024.01)
(Continued)

(52) U.S. Cl.
CPC .......... *B60K 26/021* (2013.01); *B60K 35/212* (2024.01); *B60K 35/25* (2024.01); *B60K 35/28* (2024.01); *B60L 15/20* (2013.01); *B60Q 5/005* (2013.01); *B60K 2026/022* (2013.01); *B60K 2026/025* (2013.01); *B60K 2360/162* (2024.01); *B60K 2360/77* (2024.01)

(58) Field of Classification Search
CPC .... B60K 26/021; B60K 35/28; B60K 35/212; B60K 35/25; B60K 2360/77; B60K 2360/162; B60K 2026/022; B60K 2026/025; B60L 15/20; B60Q 5/005
See application file for complete search history.

(56) References Cited

U.S. PATENT DOCUMENTS 9,890,849 B1 *  2/2018  Hall ...................... F16H 59/044
2003/0188594 A1 * 10/2003  Levin ...................... F16H 61/24
                                                    74/473.12

(Continued)

OTHER PUBLICATIONS

Christopher Phillips, et al., "Emulation of Petrol-Based Vehicle Packages in Electric Vehicles", (U.S. Appl. No. 18/621,259, filed Mar. 29, 2024).

(Continued)

*Primary Examiner* — Naeem Taslim Alam
(74) *Attorney, Agent, or Firm* — HG LAW LLP

(57) ABSTRACT

Systems and methods are presented herein for providing haptic feedback by a shifter assembly in an electric vehicle based on a data structure corresponding to a vehicle architecture that is different from the electric vehicle. The shifter assembly is determined by processing circuitry to be in communication with at least one control unit of the electric vehicle. Using the processing circuitry, a shifter haptic feedback data structure is retrieved from a server. A configuration of the shifter assembly, that indicates a number of slots of the shifter assembly, is identified using the processing circuitry. The shifter haptic feedback data structure is compared to the shifter assembly. Based on the comparing, the processing circuitry determines is made that the configuration of the shifter assembly includes a same number of slots as the shifter haptic feedback data structure. Haptic feedback is generated via the shifter assembly.

20 Claims, 18 Drawing Sheets

(51) Int. Cl.
*B60L 15/20* (2006.01)
*B60Q 5/00* (2006.01)

(56) References Cited

U.S. PATENT DOCUMENTS

| | | | |
|---|---|---|---|
| 2014/0260749 A1* | 9/2014 | Vermeersch | F16H 61/24 |
| | | | 74/473.3 |
| 2021/0102623 A1* | 4/2021 | Saletel | F16H 59/0204 |
| 2022/0041062 A1 | 2/2022 | Nishimine et al. | |
| 2023/0285870 A1* | 9/2023 | Hsu | A63H 33/26 |
| 2024/0181893 A1* | 6/2024 | Oh | B60L 15/20 |
| 2024/0278651 A1* | 8/2024 | Norris | B60L 15/20 |

OTHER PUBLICATIONS

Christopher Phillips, et al., "Emulation of Petrol-Based Vehicle Packages in Electric Vehicles", (U.S. Appl. No. 18/621,262, filed Mar. 29, 2024).

* cited by examiner

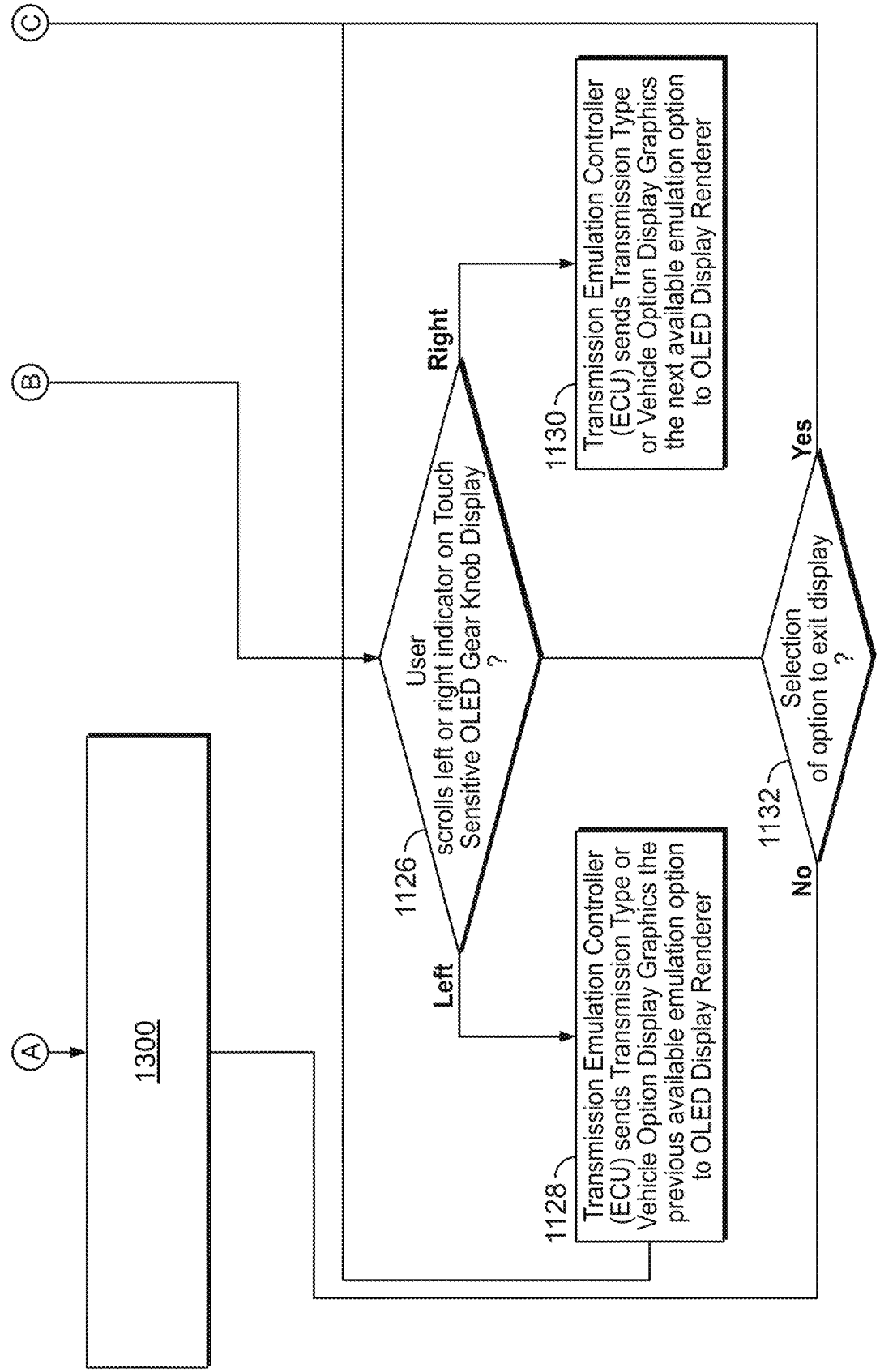

ADVANCED GATED SHIFTER FOR VEHICLE MANUAL AND AUTOMATIC TRANSMISSION EMULATION

INTRODUCTION

The present disclosure relates to a shifter assembly which can emulate a manual or an automatic transmission shifter of a vehicle, and more particularly, to systems and methods that provide shifter profiles accessible via the shifter assembly to enable the shifter assembly to emulate the feel of shifters of a plurality of alternative vehicle variants (e.g., reaction engine vehicles or hybrid powertrain vehicles).

SUMMARY

In response to consumer demand, automobile manufacturers are increasingly producing electric vehicles ("EVs") in place of gasoline, or petrol, fueled vehicles. Additionally, EVs are being developed to comply with various noise criteria either corresponding to pollution initiatives or consumer preferences. Some EV manufacturers incorporate features or "feel" of typical internal combustion engine ("ICE") vehicles to satisfy consumers who enjoy aspects and characteristics corresponding to ICE automobiles. For example, in some approaches, an EV may be configured to simulate a set of operational criteria typically associated with an ICE vehicle (e.g., noises and feedback related to acceleration or speed changes)). In some approaches, vehicle manufacturers provide EV vehicles with driving performance metrics similar to high-power ICE vehicles they also manufacture. Consumers who enjoy operation of the ICE powertrain vehicles and the related operational feedback are not, however, exposed to all of the same operational feedback when using an EV with similar acceleration rates or speed ranges. For example, EV iterations of vehicles cannot match each of the operational parameters of a ICE powertrain vehicle resulting in differences in torque curves of petrol engines and the torque output of the electric motors in EV assemblies, audible operation differences, and a loss of vibration of a combustion as EV assemblies lack a corresponding vibrating component during operation.

In some approaches, vehicle emulation packages may be developed to allow an EV to emulate operational feedback to a consumer that allows the consumer to feel as though the EV operates similar to a combustion engine version of the EV. For example, a vehicle service center or vehicle application database with e-commerce capabilities may be utilized to provide owners of EV vehicles to search for, review, and purchase emulation profiles of historical vehicles (e.g., from a particular vehicle line or manufacturer) for a unique driving experience in their EV. Many of these historical vehicles may be manual transmissions. To provide a high-fidelity emulation, there is a need to emulate a manual transmission and shifting as close as possible to the vehicle being emulated for the best vehicle emulation user experience.

Due to costs associated with manufacturing a shifter assembly (e.g., for EV emulation of an ICE powertrain), vehicle manufacturers may develop approaches where a shifter assembly is integrated into the EV build such that the shifter is provided as a means for performing some aspect of EV operation regardless of whether of the emulation profile is enabled as opposed to providing a connection interface for coupling a shifter assembly manufactured by a different supplier. For example, EVs can be built with knobs, or other shifter apparatuses, that allow an occupant to change between one or more of park, drive, and reverse settings. Additionally, or alternatively, there are available controllers that appear as shifter assemblies (e.g., for driving simulations or video game related applications). As used herein, a shifter assembly can also be considered a shifter accessory. For example, a shifter assembly that is removable from an EV without disrupting operation of the EV (e.g., a modular shifter assembly) can be considered a shifter accessory. Preferably, an EV includes a shifter assembly that is integrated into the EV assembly that incorporates at least the baseline function of the aforementioned knob with added functions beyond those of the shifter assembly used for driving simulations or video game related applications to provide an immersive real-world shifting experience in an EV. As described herein, a shifter assembly is provided that can interface with the EV to emulate the shifting experience typically found in an ICE vehicle. In some embodiments, the shifter assembly may interface with other devices (e.g., home entertainment devices, personal mobile devices, augmented reality devices, or virtual reality devices) to provide the consumer an option to experience the emulated shifting in contexts other than driving (e.g., such as while simulating a driving experience at home or playing a driving video game). This provides an innovative shifter assembly that is configured to provide a variety of functional outputs perceivable by an EV occupant to advance the capabilities of different consumer experiences related to emulation of various ICE builds using an EV.

Some EV builds may include a first interface for a manual shifting experience (e.g., a first panel, a first assembly, or a first set of selectable buttons or icons) and a separate second interface (e.g., a second panel, a second assembly, or a second set of selectable buttons or icons) for automatic shifting (e.g., to allow user section between "drive" and "reverse" while the EV controls torque output curves for electrical motor output based primarily on user input to an accelerator). Although certain aspects of emulating a manual transmission are available for consumption, the shifter assembly may also emulate an or provide the experience of an automatic transmission. Accordingly, if desired, a user of single shifter assembly may change between manual transmission emulation and automatic transmission emulation.

The present disclosure is directed to a shifter assembly, or shifter accessory, which can emulate a manual transmission shifter (e.g., a shifter for a manual transmission with anywhere from 1 to 6 gears corresponding to different vehicle/powertrain speed ranges, including a gear for reverse), as well as gear positions for automatic transmissions, and is configured for interfacing with one or more EV assemblies as well as other end user devices. For a manual transmission mode, the shifter generates haptic feedback for an emulation of gear grind. Gear grind is experience in ICE builds with a shifter assembly when a vehicle occupant attempts to shift between gears of a manual transmission and the vehicle occupant received physical feedback through the shiftier. The shifter assembly of this disclosure is configured to generate one or more of physical (e.g., by way of resistance), audio, or haptic feedback (e.g., corresponding to vibrational feedback) for EV occupant perception is based on a gear ratio of a respective gear that the occupant would be attempting to shift to considering the gear ratio of the gear shift that would be attempted based on an EV output (e.g., a target motor speed or road wheel torque). The haptic feedback provided, or generated, by the shifter assembly when interfacing with the EV is related to what would be an engine RPM and the final drive ratio of a vehicle with a manual transmission and a reaction engine based powertrain. Additionally, the haptic feedback generated by the shifter assembly for EV occupant perception may account for feedback that may be generated by a shifter assembly of an ICE vehicle build when a clutch pedal is depressed (e.g., to disengage a clutch body from a gear) or not depressed (e.g., to maintain contact between a clutch body and a gear).

In some embodiments, the shifter assembly communicates with an EV occupant interface that allows the EV occupant to select different shifter knob configurations such that the occupant can modify the haptic output to align with different manual or automatic transmission configurations (e.g., corresponding to non-EV variants of a vehicle that shares at least one build protocol with the EV vehicle in which the shifter assembly is installed). Additionally, or alternatively, the shifter assembly may be configured to process one or more elements of an overall vehicle assembly emulation data structure that incorporates a plurality of transmission options with corresponding emulation output data. For example, a vehicle may be manufactured with one or more of an automatic transmission, a 5 speed manual transmission, or a 6 speed manual transmission. With the shifter assembly of this disclosure, an EV consumer may be able to emulate each of these different transmission using the shifter assembly in their EV or other compatible devices.

In some embodiments, the shifter assembly is configured to provide haptic feedback. A shifter assembly in this disclosure is the components that form a means to allow a vehicle occupant to move between shifter slots and engage, or disengage, different gears. A shifter assembly in this disclosure is a subassembly that interfaces with a vehicle assembly and can be removed from the vehicle assembly without affecting the overall operation of the vehicle assembly (e.g., in a manner similar to how a mobile device can be communicatively paired with a vehicle and unpaired without preventing the vehicle assembly from operating). Additionally, or alternatively, the shifter assembly may be incorporated directly into the EV build and is provided as part of the assembly that comes off the manufacturing line for transport to consumers. In an embodiment, one or more disclosed systems determine, using processing circuitry, that the shifter assembly is communicatively coupled to at least one control unit of the EV build. The at least one control unit and other control units of this disclosure include one or more processors, and related transmission circuitry compatible with the processing and transmission requirements of a particular EV build, that are capable of one or more of receiving data from a vehicle network, capable of retrieving a shifter emulation data structure, extracting instructions from the shifter emulation data structure based on the data received from the vehicle network, or transmitting instructions to various elements of an EV or a shifter assembly for shifter emulation. Processing circuitry (e.g., of the at least one control unit) retrieves a shifter haptic feedback data structure from a server communicatively accessible to one or more processors, processing circuitries, or control units of the vehicle. A configuration of the shifter assembly is identified using the processing circuitry, wherein the configuration indicates a number of shifting slots of the shifter assembly. The shifter haptic feedback data structure is compared to the configuration of the shifter assembly. Based on the comparing and using the processing circuitry, a determination is made that the configuration of the shifter assembly is compatible with at least one element of the shifter haptic feedback data structure. Based on instructions from the at least one control unit, haptic feedback is generated via the shifter assembly.

These techniques solve the problems of other approaches described above. In particular, this approach does not rely only on data structures or components incorporated into an EV build right off the manufacturing line in order to configure an EV to providing an emulation experience. Thus, an EV consumer is provided a personal form of customization within the bounds of the available options corresponding to the EV. Additionally, this approach does not require the EV consumer to be limited to a particular model year or era of vehicle builds to emulate. By having a plurality of accessible emulation package data structures accessible to the shifter assembly, as opposed to only being provided a data structure with an initial EV build, the EV consumer has the ability to modify operational feedback of their EV as the consumer prefers. The approach also addresses the deficiencies in the manufacturer integrated emulation approach as the consumer is provided an option to experience certain emulated shifter operational feedback with a plurality of devices beyond the EV (e.g., racing simulators).

In some embodiments, the shifter assembly generates haptic feedback for a perceivable emulation of gear grind based on the gear ratio of a gear (e.g., a gear that would exist in an ICE vehicle build that is not directly replicated by the road wheel motor transmissions of EV builds) attempting to be shifted considering one or more of the gear ratio of the gear shift attempted, the engine RPM, or the final drive ratio. In a manual transmission ICE vehicle build, one or more of paddle shifters or a clutch pedal assembly is provided which, when depressed, allow for articulate of a shifter level through slots of a shifter pattern. EV builds lack one or more of a paddle shifter or a clutch pedal assembly. Accordingly, a clutch flag is provided in this disclosure. The clutch flag corresponds to depression and release of an EV false clutch pedal. For example, when the clutch flag is raised or positive, the EV considers a representative clutch as engaged. Additionally, or alternatively, the lack of a clutch flag or a clutch flag is negative indicates a clutch is disengaged and shifting of a lever of a shifter assembly may only be permitted based on an alignment of engine RPM and final gear ratio of a target shift pattern slot.

In some embodiments, a clutch pedal accessory can be paired with a shifter assembly in order to create a more immersive shifter emulation experience. Additionally, or alternatively, the clutch pedal accessory can be replaced by a data structure, signal, or clutch status flag (e.g., the aforementioned clutch flag) in order to provide an indication to the EV system of what shifter output are to be expected (e.g., considering whether the clutch is engaged or disengaged). Considering the adaptability of the shifter assembly of this disclosure with other devices, the shifter assembly may also interface with personal devices including a gaming system (e.g., as part of one or more of a personal computing device, augmented reality device, virtual reality device, or smart interactive display) for racing simulators with vehicles with different types of powertrains and transmission combinations accessible for the racing simulators.

In some embodiments, the shifter assembly may be characterized as a gated shifter. The gated shifter includes components and circuitry for locking out mechanical slots of the assembly thereby forming a gear pattern corresponding to a data structure of a manual or an automatic transmission selected for emulation. The gated shifter may also only lock out one or more portions of the different slots of the assembly to accurately emulate missing or partial shifts of the shifter knob into respective shifter slots of the assembly. In order to develop a data structure for advanced shifter emulation via the gated shifter, one or more of gear grind based on a motor or output revolutions per minute (hereinafter RPM), a gear ratio, a final drive ratio, a target vehicle speed, or a current vehicle speed may be incorporated into the emulation data structure to provide the user with a perception that he is utilizing a shifter for a "real" manual transmission vehicle.

Resistance shifting may be a feedback output experienced by users of the gated shifter. For example, a gated shifter may provide the tactile feel of shifting a shifter knob into a slot corresponding to a mechanical transmission gear based at least in part on detection of when RPM and transmission speed should match (e.g., as would be in a vehicle build with a manual transmission and a combustion engine powertrain) thereby allowing for a simulation of shifting between mechanical gears without pressing and releasing a clutch that would mechanically enable modification of the transmission gear using a shifter knob in an ICE build with a manual transmission. In some embodiments, the gated shifter may have a default setting corresponding to a transmission being in a neutral configuration such that a vehicle powertrain is not engaged mechanically with transmission gears to cause the vehicle to move forwards or backwards. The gated shifter may also incorporate an organic light-emitting diode (hereinafter "OLED") touch sensitive display that is configured for displaying a gear pattern for EV operator interactive that displays at least one of a gear pattern corresponding to a selected emulation data structure or an option to modify a current transmission emulation type selected for generating operational feedback.

In some embodiments, the disclosure is directed to a method of transmission shifting emulation in one or more of an end user device or an EV. A determination made (e.g., using processing circuitry) that a shifter assembly is communicatively coupled to at least one control unit of a vehicle (e.g., an EV configured to interface with the shifter assembly). A shifter haptic feedback data structure is retrieved from a server communicatively accessible via the vehicle. A configuration of the shifter assembly is identified, wherein the configuration indicates a number of shifting slots of the shifter assembly. The shifter haptic feedback data structure is compared to the configuration of the shifter assembly. Based on the comparing and using the processing circuitry, a determination is made that the configuration of the shifter assembly is compatible with at least one element of the shifter haptic feedback data structure (e.g., the accessory can provide access to, block, or at least partially block a correct number of slots as defined in instructions corresponding to the data structure). Based on instructions from the at least one control unit, one or more gates of the shifter assembly are caused to at least partially mechanically block or unblock one or more slots of the shifter assembly resulting in haptic feedback to be transmitted through a shifter knob of the shifter assembly.

In some embodiments, the shifter assembly is communicatively coupled to the at least one control unit of the vehicle via one or more of a local network or wireless communication stream. Additionally, or alternatively, the shifter assembly is mechanically coupled to a communication port of the vehicle to be communicatively coupled to the at least one control unit of the vehicle. In some embodiments, each slot the shifter assembly comprises at least one respective gate of the one or more gates of the shifter assembly.

In some embodiments, the server is configured to store a plurality of shifter haptic feedback data structures corresponding to one or more of a respective plurality of alternative transmission assemblies of vehicle assemblies, a number of gears of one or more transmission assemblies, or one or more gear ratios corresponding to the one or more transmission assemblies. For example, there are transmission assemblies that support shifting between one and six gears for different vehicle responses to throttle when going forward with another gear for ensuring the vehicle can be driven in reverse. Each of the gear ratios for the gears for driving forward and the gear for driving in reverse have different sizes and cause different vehicle level responses (e.g., as characterized by sensitivity to throttle inputs as well as availability based on one or more of engine RPMs and vehicle road speeds).

In some embodiments, the shifter haptic feedback data structure comprises computer readable instructions for generating audio for perception in a vehicle occupant compartment corresponding to each element of haptic feedback generated via the shifter assembly. Additionally, or alternatively, the shifter haptic feedback data structure comprises computer readable instructions for generating feedback via the shifter assembly independent of a clutch status. The shifter haptic feedback data structure is comprised of computer readable instructions that cause the shifter assembly to replicate one or more of resistance loads to emulate via the shifter assembly when the shifter assembly is manipulated between the number of shifting slots, a gear grind feedback, a drive mode of the vehicle, blocked slots, transient blocked slots based on a missed gear shift caused by manipulation of the shifter assembly, or sounds corresponding to one or more shifting activities performed via the shifter assembly.

In some embodiments, the shifter assembly comprises a display. The display may be configured for one or more of providing a readout of a replicated gear state, providing a biometric interface for accessing settings corresponding to the shifter assembly, or identifying one or more vehicle occupants. Additionally, or alternatively, the display may be updated based on a proximity of a hand to the display of shifter assembly.

In some embodiments, the instructions from the at least one control unit are generated based on one or more of a current vehicle operating state, motion detected within a passenger compartment of the vehicle, or haptic feedback capabilities of the shifter assembly. A current vehicle operating state includes one or more of a powertrain operating in idle, a powertrain operating to propel a vehicle forward or reverse, an auxiliary power mode where a powertrain is not provided enough power to propel the vehicle, an emulation selection mode, an emulation rendering mode, or an autonomous driving mode.

In some embodiments, the disclosure is directed to a system comprising an apparatus comprising one or more of an entertainment device, a mobile device, or a vehicle assembly. The apparatus also includes a communication interface, processing circuitry, and at least one control unit. The system further includes a server communicatively accessible via the processing circuitry, and a shifter assembly communicatively coupled to the communication interface. The processing circuitry of the apparatus, or the system overall, may be configured to execute instructions stored via a non-transitory computer readable medium, wherein the instructions correspond to system execution of one or more elements of the one or more methods of this disclosure.

BRIEF DESCRIPTIONS OF THE DRAWINGS

The above and other objects and advantages of the disclosure may be apparent upon consideration of the following detailed description, taken in conjunction with the accompanying drawings, in which.

Figure 13:
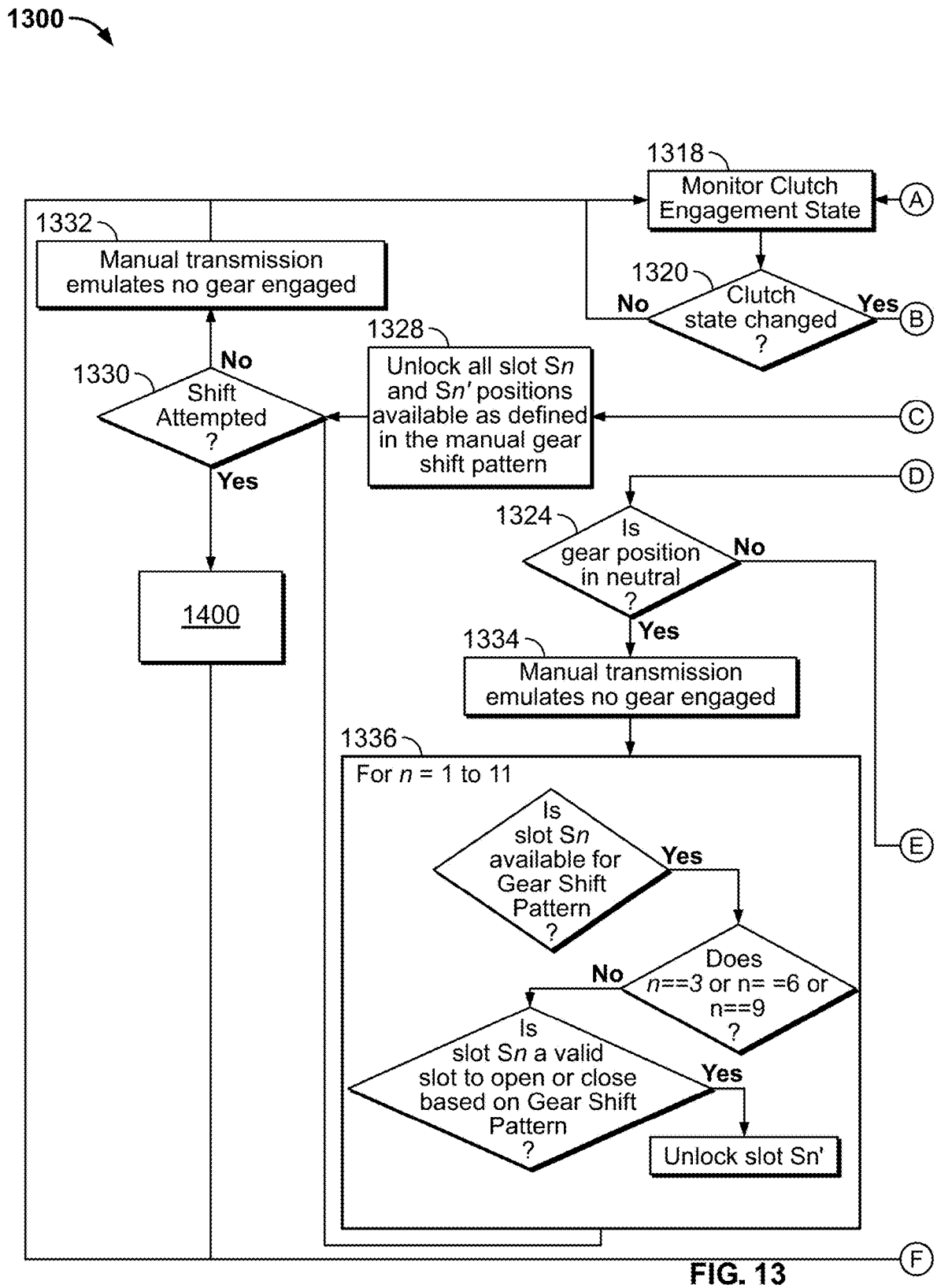
Figure 13:
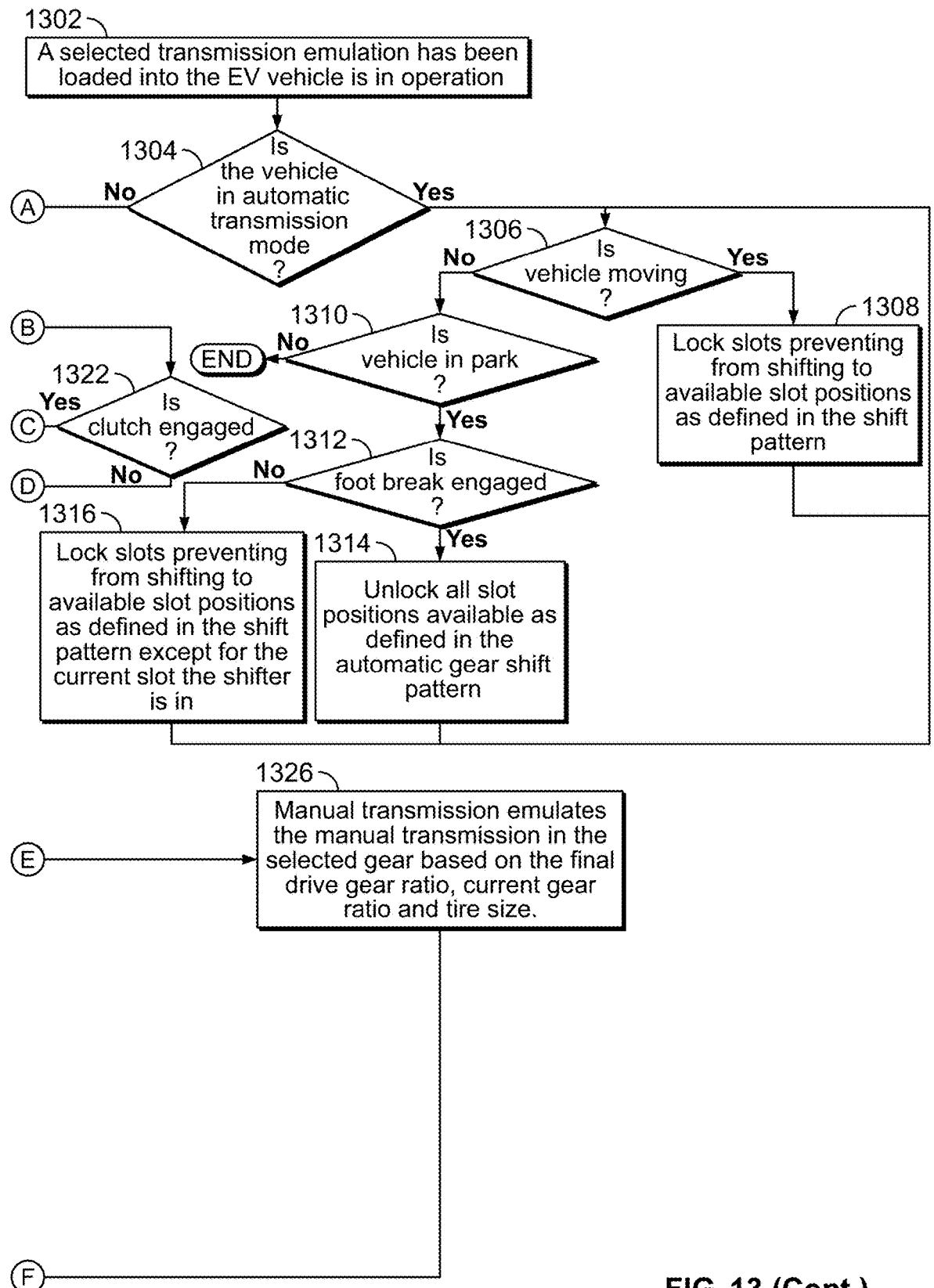
Figure 14:
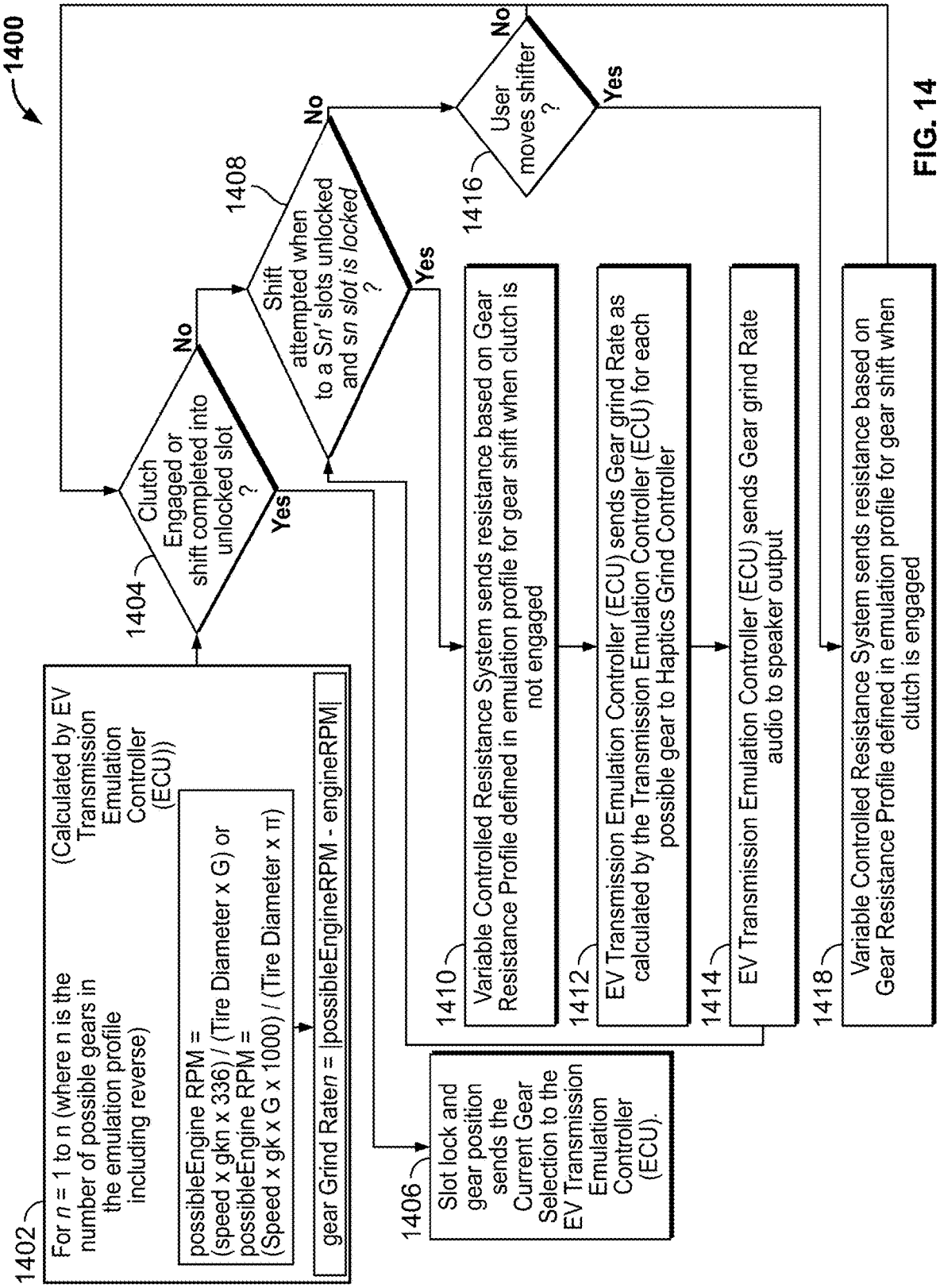

FIG. 13 is a flow chart representing an illustrative process for emulating a change of gears in a transmission using a shifter assembly that interfaces with an EV, in accordance with some embodiments of the disclosure; and FIG. 14 is a flow chart representing an illustrative process for modifying an output of a shifter assembly to emulated one or more of gear grind or shift resistance, in accordance with some embodiments of the disclosure.

DETAILED DESCRIPTION

Methods and systems are provided herein for emulation of shifting of an ICE vehicle build transmission using a shifter assembly that interfaces with an EV.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory (RAM), etc.

Figure 1:
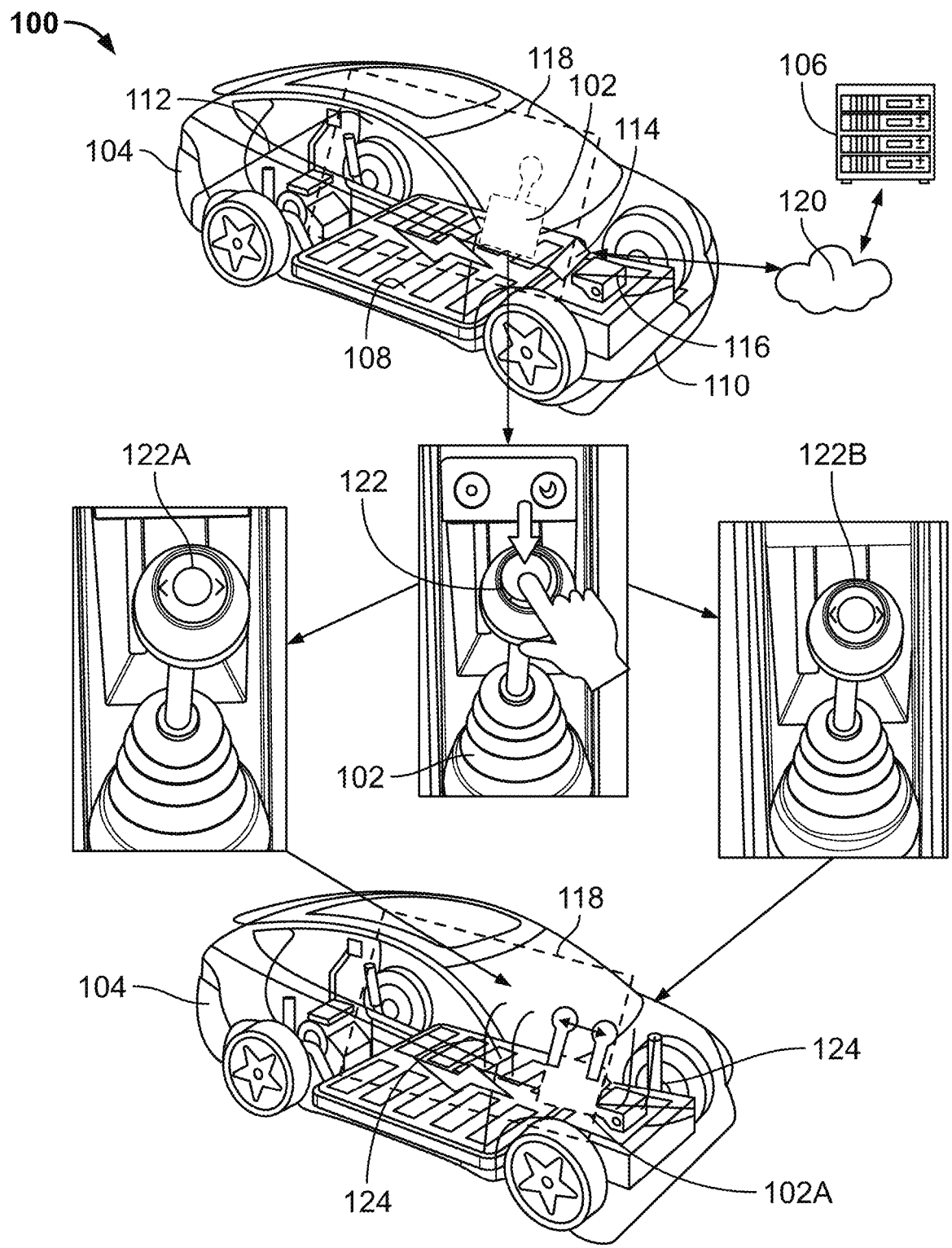
FIG. 1 depicts a shifter assembly of an electric vehicle being used to access different shifter emulation profiles, in accordance with some embodiments of the disclosure.

FIG. 1 depicts emulation system 100, which includes shifter assembly 102 of EV 104 being used to access different shifter emulation profiles, in accordance with some embodiments of the disclosure. Emulation system 100 may incorporate, or be incorporated into, in whole or in part into any or all of the assemblies, or subassemblies, shown in or described in reference to FIGS. 2-9. Additionally, or alternatively, emulation system 100 may be configured to execute, in whole or in part, any or all of the processes shown in or described in reference to FIGS. 10-14.

Emulation system 100 is comprised of shifter assembly 102, EV 104, and server 106. Server 106 is communicatively coupled to, or communicatively accessible by, shifter assembly 102. For example, a local or other network (e.g., network 120) may be configured to allow shifter assembly 102 to transmit requests to server 106 and receive data structures (e.g., emulation profiles or haptic feedback data structures) from server 106 such that shifter assembly 102 can generate perceivable feedback to an occupant of EV 104. EV 104 is comprised of power source 108, front propulsion assembly 110, rear propulsion assembly 112, processing circuitry 114, control unit 116, and occupant compartment 118. Shifter assembly 102 is shown as being in communication with processing circuitry 114. Processing circuitry 114 may be integrated into shifter assembly 102 or may be integrated into vehicle 104. Control unit 116 is also communicatively coupled to processing circuitry 114 and control unit 116 is integrated into vehicle 104 to provide data corresponding to performance metrics or outputs of one or more of power source 108, front propulsion assembly 110, or rear propulsion assembly 112. For example, control unit 116 may be configured to receive, record, or transmit one or more data elements related to rotational outputs of wheels or motors of front propulsion assembly 110 or rear propulsion assembly 112. Additionally, or alternatively, control unit 116 may be configured to receive, record, or transmit one or more data elements that characterize an operating state or power output of power source 108. Control unit 116 may be considered a conduit of data processed, transmitted, or received throughout a vehicle data network that communicatively couples one or more modules of vehicle 104 in order to provide parameters for emulating one or more elements of modifying a shifter knob position to engage or disengaged emulated gears via shifter assembly 102.

Emulation system 100 is configured to retrieve a data structure for haptic feedback to be experienced in occupant compartment 118 based on modification of outputs of shifter assembly 102. For example, an occupant within occupant compartment 118 may interface with shifter knob display 122 in order to request a data structure from server 106 via network 120 in order to emulate a non-EV transmission in EV 104 via shifter assembly 102. The occupant may interface with shifter knob display 122 by touching the display or motioning with their hand to activate an interface for selecting one or more data structures for emulating alternative transmissions setups compatible with EV 104 via shifter assembly 102. As shown via shifter knob display 122A, a manual transmission emulation data structure may be selected. Additionally, or alternatively, an automatic transmission emulation data structure may be selected as shown via shifter knob display 122B. Once a transmission emulation data structure has been selected via shifter knob display 122 and retrieved from server 106, shifter assembly 102A exemplifies haptic feedback 124 perceivable in occupant compartment 118 upon articulation, or operation, of shifter assembly 102A (e.g., corresponding to shifter assembly 102 having an active emulation profile that is providing instructions for haptic feedback). In some embodiments, server 106 may be accessible by one or more vehicle manufacturers that have the capabilities to provide an emulation or haptic feedback data structure for non-EV vehicles with at least one shared build configuration element with EV 104 (e.g., wheel base, suspension height, suspension types, weight, wheels, tires, or combinations thereof). Additionally, or alternatively, server 106 may include one or more emulation data structures or haptic feedback data structures provided by one or more video game producers who generate such data structures for immersive video game controls, virtual reality controls, augmented reality controls, or combinations thereof, for vehicles that share at least one build configuration element with EV 104.

Figure 2:
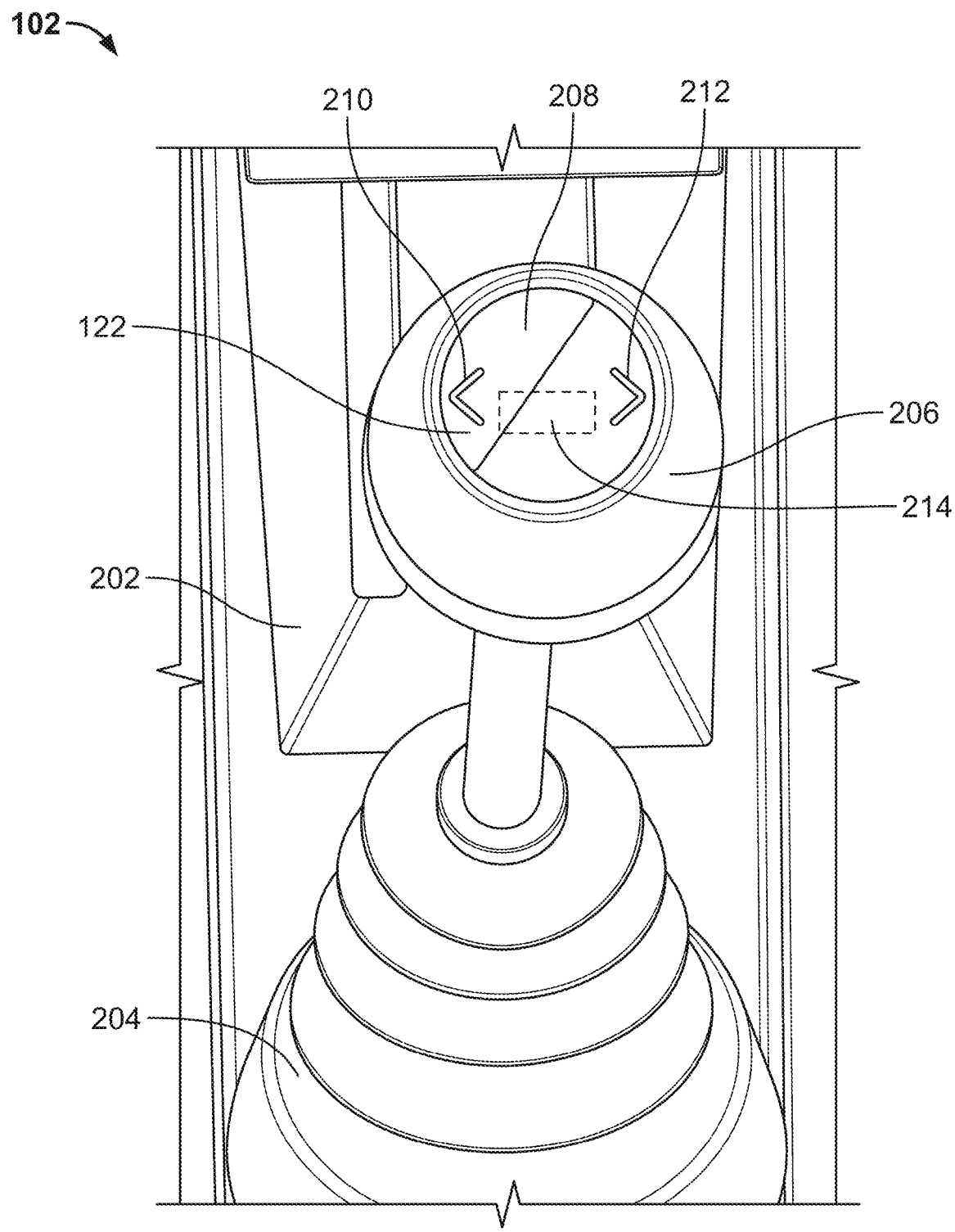
FIG. 2 depicts an interactive display of a shifter assembly, in accordance with some embodiments of the disclosure.

FIG. 2 depicts interactive display 122 of shifter assembly 102, in accordance with some embodiments of the disclosure. Shifter assembly 102 may incorporate, or be incorporated into, in whole or in part into any or all of the assemblies, or subassemblies, shown in or described in reference to FIGS. 1 and 3A-9. Additionally, or alternatively, shifter assembly 102 may be configured to execute, in whole or in part, any or all of the processes shown in or described in reference to FIGS. 10-14.

Interactive display 122 provides a readout of a replicated gear state after an emulation data structure or haptic feedback data structure is selected for use in shifter assembly 102 using interactive display 122 (e.g., as provided by a remote server communicatively accessible via shifter assembly 102). Interactive display 122 is configured for receiving inputs from a vehicle occupant in order to select an emulation data structure to load onto shifter assembly 102 to emulate a different shifting experience that would otherwise be a default shifting experience corresponding to an EV comprising, or interfacing with, shifter assembly 102. The inputs from the vehicle occupant may include one or more of touching interactive display 122, providing verbal commands, or motioning the occupant's hand in a manner that allows one or more of a sensor or camera to perceive an input from the vehicle occupant for modifying the contents shown via interactive display 122. As shown in FIG. 2, shifter assembly 102 comprises interactive display 122, shifter knob 206, shifter shaft 202, and shifter box 204. Interactive display 122 is mounted to shifter knob 206. Shifter knob 206 is secured to shifter shaft 202 and shifter shaft 202 provides a means to navigate through slots of shifter box 204. Shifter box 204 may, for example, comprise a series of gates and actuators for the gates to emulate different configurations of slots based on an emulation profile selected via interactive display 122.

Interactive display 122 includes emulation profile scrolling options 210 and 212 along with emulated vehicle icon 208 and emulation profile status 214. Emulation profile scrolling options 210 and 212 enable a vehicle occupant interfacing with shifter assembly 102 to review options for different emulation profiles. These options may be stored, for example, on a remote server communicatively accessible via shifter assembly 102. Emulated vehicle icon 208 provides a visual indication of the type of vehicle that is being emulated via shifter assembly 102. Emulated vehicle icon 208 may include one or more of a graphic representation of the emulated vehicle or one or more characters describing the emulated vehicle (e.g., a model number or a vehicle make and vehicle model text string). The information conveyed via emulated vehicle icon 208 may be a function of a display size on shifter knob 206. For example, depending on a pixel count available on interactive display 122, different iterations of emulated vehicle icon 208 may be generated for display on different iterations of shifter assembly 102 with different sizes of knob 206 or different sized of interactive display 122. Arranged below emulated vehicle icon 208 is emulation profile status 214, which conveys to a vehicle occupant whether the data structure associated with emulated vehicle icon 208 is one or more of available via the server, is available on shifter assembly 102, is currently active in an EV that is interfacing with or using shifter assembly 102, is compatible with the EV interfacing with shifter assembly 102, or is inactive on shifter assembly 102.

In some embodiments, interactive display 122 includes a biometric verification security option. For example, one or more of shifter assembly 102, shifter shaft 202 knob 206, or interactive display 122 may interface with or be comprised of a camera or sensor configured for biometric recognition of vehicle occupants. The biometric recognition may comprise one or more of voice recognition, facial recognition, or finger print recognition. This provides a level of security when multiple vehicle occupants of varying ownership statuses may have access to an EV that includes shifter assembly 102. For example, it may be preferable to prevent access to different emulation profiles when the EV is being cared for by a garage attendant for repairs or by a valet for parking at a secured location. Additionally, or alternatively, it may be preferable to prevent different members of a same household from modifying the emulation profile used by shifter assembly 102. The incorporation of biometric authentication or verification using one or more elements of shifter assembly 102 provides a means of secured customization of the driving experience of an individual EV. Absent adequate or correct biometrics, a vehicle occupant would, therefore, be prevented from modifying settings of shifter assembly 102.

Figure 3A:
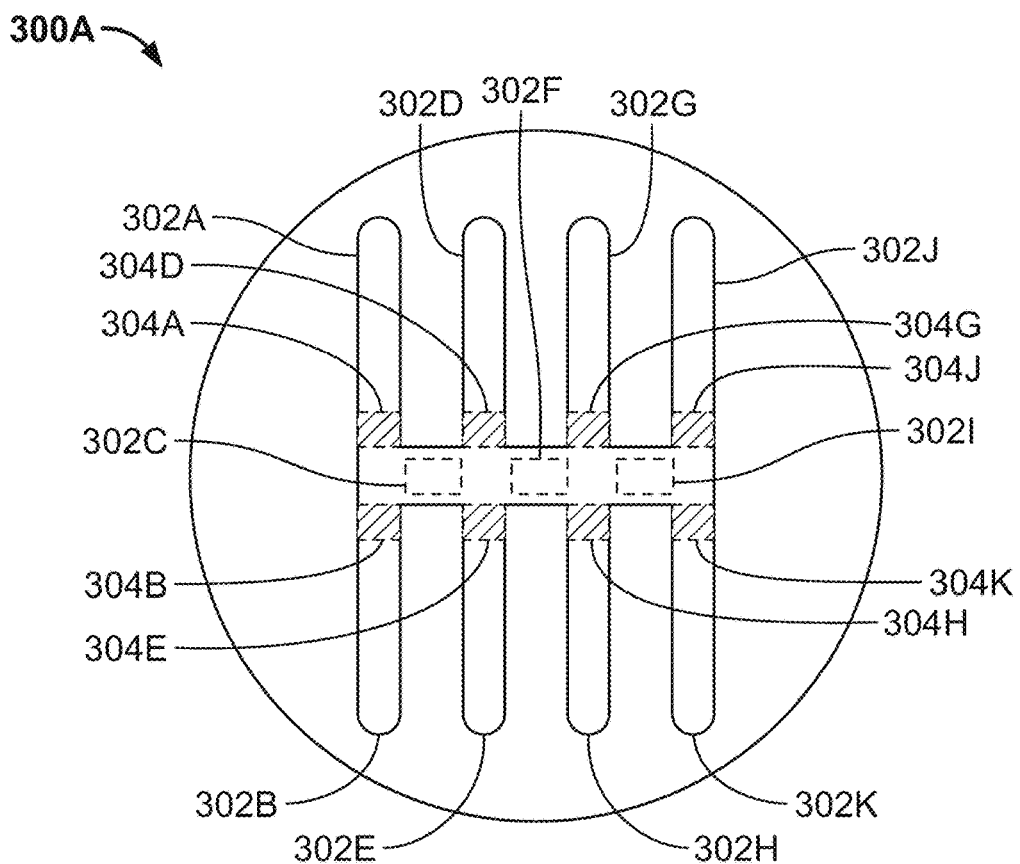
FIG. 3A depicts a gated shifter with all slots open, in accordance with some embodiments of the disclosure.
Figure 3B:
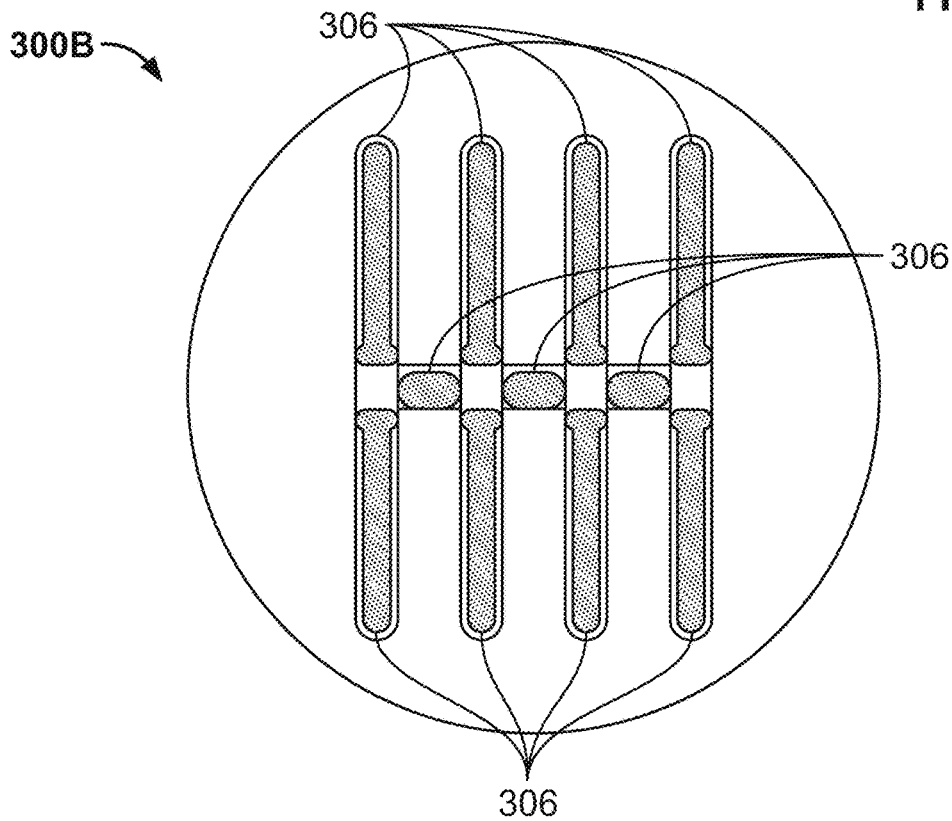
FIG. 3B depicts a gated shifter with all slots blocked by gates, in accordance with some embodiments of the disclosure.

FIGS. 3A and 3B depict gated shifters 300A and 300B that expose slots or lock out slots based on an emulation profile, in accordance with some embodiments of the disclosure. Gated shifters 300A and 300B, or be incorporated into, in whole or in part into any or all of the assemblies, or subassemblies, shown in or described in reference to FIGS. 1, 2, and 4A-9. Additionally, or alternatively, gated shifters 300A and 300B may be configured to execute, in whole or in part, any or all of the processes shown in or described in reference to FIGS. 10-14.

As shown in FIG. 3A, gated shifter 300A is comprised of gear engagement slots 302A, 302B, 302D, 302E, 302G, 302H, 302J and 302K. Gated shifter 300A also comprises lateral slots 302C, 302F, and 302I. Additionally, arranged towards central ends of the gear engagement slots are slot resistance portions 304A, 304B, 304D, 304E, 304G, 304H, 304J, and 304K. Each of gear engagement slots 302A, 302B, 302D, 302E, 302G, 302H, 302J and 302K as well as lateral slots 302C, 302F, and 302I correspond to different positions that a shifter shaft could be articulated through when shifting gears in a transmission. Slot resistance portions 304A, 304B, 304D, 304E, 304G, 304H, 304J, and 304 may comprise one or more gates coupled to actuators such that the actuators are configured to articulate the one or more gates into and out of at least one of gear engagement slots 302A, 302B, 302D, 302E, 302G, 302H, 302J or 302K in order to emulate a shifter of a non-EV vehicle via a shifter assembly comprised of gated shifter 300A by blocking a shifter shaft from entering one of the gear engagement slots, providing haptic feedback to the shifter shaft when crossing over one or more of the slot resistance portion, or increasing the force required to surpass the slot resistance portions to reach a distal end of a respective gear engagement slot. Lateral slots 302C, 302F, and 302I correspond to lateral displacement to get to different gear engagement slots that allow a user of a shifter assembly to emulate lateral displacement of a shifter shaft in a gear box. As shown in FIG. 3B, each of the shown slots can be blocked by respective actuations of gates 306. Each of gates 306 are paired with one or more actuators that are configured to cause each of gates 306 to fully block, partially block, and expose respective regions of gated shifter 300B in order to emulate a shifter from a different vehicle.

Figure 4A:
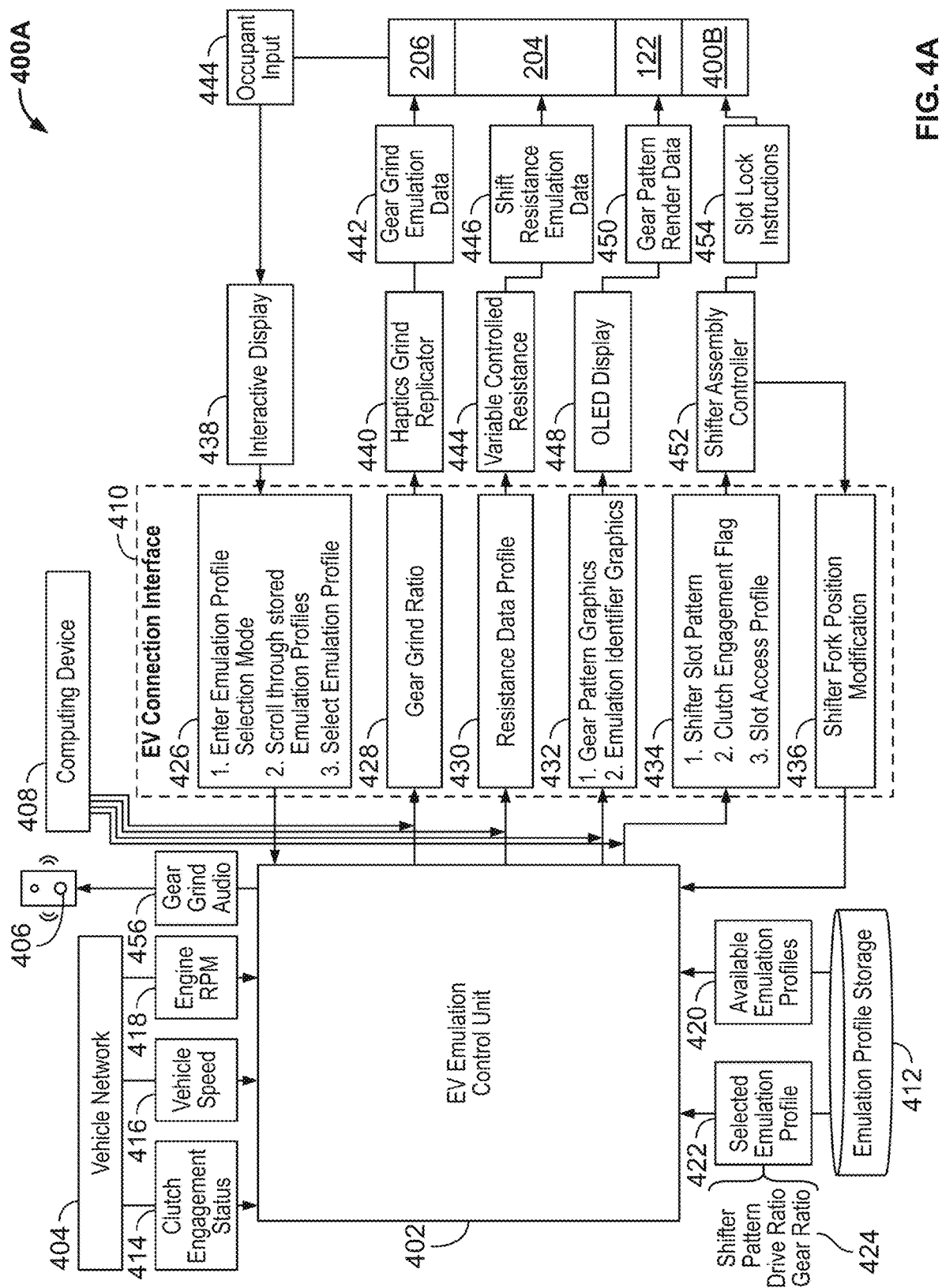
FIG. 4A depicts a vehicle system configured to interface with a gated shifter, in accordance with some embodiments of the disclosure.

FIG. 4A depicts vehicle system 400A configured to interface with a gated shifter based on a connection between EV emulation control unit 402 and the gated shifter, in accordance with some embodiments of the disclosure. Vehicle system 400A may incorporate, or be incorporated into, in whole or in part into any or all of the assemblies, or subassemblies, shown in or described in reference to FIGS. 1-3B and 4B-9. Additionally, or alternatively, vehicle system 400A may be configured to execute, in whole or in part, any or all of the processes shown in or described in reference to FIGS. 10-14.

Vehicle system 400A includes EV emulation control unit 402 which interfaces with emulation profile storage 412, vehicle network 404, audio output device 406, computing device 408, and EV connection interface 410. In some embodiments, EV connection interface 410 corresponds to one or more processors, and related circuitry, for creating one or more of a mechanical connection or local network connection with gated shifter 400B of FIG. 4B. EV connection interface 410 serves as a conduit of data and information between EV emulation control unit 402, vehicle network 404, and a shifter assembly (e.g., gated shifter 400B). EV emulation control unit 402 is comprised of one or more processors, and related circuitry, for controlling the emulation of different shifter profiles in an EV that is interfacing with a shifter assembly. EV emulation control unit 402 interfaces with emulation profile storage 412 and vehicle network 404 to provide data and information necessary for shifter emulation by a shifter assembly that is connected to an EV through EV connection interface 410. The processing circuitry of EV emulation control unit 402 may, for example, store one or more non-transitory computer readable mediums comprising instructions for executing one or more elements of any or all of the methods of this disclosure using the system architectures of this disclosure. In some embodiments, the processing circuitry of EV emulation control unit 402 is directly integrated in the EV circuitry. The integration may occur through a single separate module (e.g., a housed collection of processors and related circuitry that only operate when provided adequate flags or activation data) or one or more elements of EV emulation control unit 402 may be dispersed throughout multiple modules, or processing circuitry units, that are capable of interfacing with each other through local wireless networks or vehicle network 404.

Vehicle network 404 incorporates any suitable communication network architecture for providing sensor data, module data, or any suitable form of data from a first module, or processor, to a second module, or processor, in order to generate, transmit, and execute various operations for suitable EV operation in varying conditions. For example, vehicle network 404 may be considered a vehicle bus corresponding to a specializes internal communications network that interconnects components, subsystems, or sub-assemblies of the vehicle. A vehicle bus is an apparatus or arrangement of devices for interfacing multiple devices for operation of a larger architecture or system (e.g., an EV or system thereof). Vehicle network 404 enables control of various components, systems, or subsystems of vehicle system 400A, for example, based on various requirements for message, or data, delivery by eliminating conflicting data transmission while also providing adequate redundancies to avoid single point failures within vehicle network 404. In some embodiments, vehicle network 404 utilizes one or more suitable networking protocols such as one or more of Controller Area Network (CAN) or Local Interconnect Network (LIN). The speed of data or message transmission and subsequent processing thereby for operating an EV may, in some embodiments, be dependent on the nature of processors, processing circuitry, and complexity of message conflict reviews.

As shown in FIG. 4A, vehicle network 404 is configured to transmit messages from one or more different vehicle modules, sensors, or processors to EV emulation control unit 402. For example, each of clutch engagement status 414, vehicle speed 416, and engine RPM 418 (e.g., where RPM stands for "revolutions per minute") are messages transmitted from other parts of vehicle system 400A to EV emulation control unit 402 in order to provide current operational data of various pertinent components of vehicle system 400A for providing an accurate shifter emulation experience in an EV comprised of vehicle system 400A. As an EV lacks a reaction or ICE with a crank shaft assembly, engine RPM 418 may correspond to a rotational output of motors or actuators configured to provide rotational outputs to road wheels of the EV. In some embodiments, one or more onboard vehicle processors or processors in one or more communicatively linked processing circuitries are configured to provide a mapping of engine RPM signals and data from a manual transmission vehicle assembly to the current EV vehicles and the road wheel motor rotational outputs to provide an adequate conversion and translation between processors, processing circuitries, or modules when attempting to emulate a manual shifting experience in an EV without a manual transmission that is currently interfacing with, for example, a shifter assembly. Either simultaneously or progressively, depending on processing and rendering protocols of EV emulation control unit 402, emulation profile storage 412 is also communicatively accessible to EV emulation control 402. Emulation profile storage 412 may be a local storage apparatus (e.g., a memory chip, memory bank, or server) within an EV comprised of vehicle system 400A or emulation profile storage 412 may, in some embodiments, be a remote data storage server configured to receive requests for data and transmit data based on a request.

Emulation profile storage 412 is further shown to be configured to provide available emulation profiles message 420. Available emulation profiles message 420 comprises a list of available shifter emulation data packages with identifiers for corresponding vehicle makes, models, and production years. In some embodiments, available emulation profiles message 420 comprises one or more graphical representations of corresponding vehicle builds for one or more, or each of, the emulation profiles accessible through emulation profile storage 412. In some embodiments, emulation profile storage 412 may include a network of servers connected to one or more of vehicle manufacturer databases or entertainment industry databases (e.g., corresponding to one or more of video game manufacturers, VR content producers, AR content producers, or any suitable simulation or emulation experience developers). Additionally, based on inputs received through EV connection interface 410, EV emulation control unit 402 is configured to transmit a request to emulation profile storage 412 for selected emulation profile 422 (e.g., from a list or interface that conveys selectable options for one or more data structures of available emulation profiles message 420). Selected emulation profile 422 includes emulation data structure 424 which includes various controlling algorithms, patterns, and data values that, when processed by EV emulation control unit 402, result in the generation of a series of computer readable instructions for operating components communicatively interfacing with EV connection interface 410. Emulation data structure 424 is comprised of, for example, one or more of a shifter pattern (e.g., of a real-world assembly characterized by emulation data structure 424) that includes instructions for displaying a representative shifter pattern on a display of a shifter assembly, a drive ratio corresponding to a real world vehicle assembly manufactured with the shifter pattern, or a gear ratio corresponding to the same real world vehicle assembly. Additional elements that may be incorporated into emulation data structure 424 include any suitable data that would assist in providing a complete emulation by a shifter assembly in an EV of a real-world shifter assembly in a non-EV build.

Responsive to EV emulation control unit 402 receiving a transmitted selected emulation profile 422 (e.g., inclusive of one or more elements of data structure 424), EV emulation control unit 402 processes the received data structures for transmitting computer readable instructions to various other EV components or accessories through EV connection interface 410. For example, the processing circuitry corresponding to EV emulation control unit 402 may be configured to convert data received from emulation profile storage 412 to various messages with instructions for execution of shifter emulation by one or more elements of a shifter assembly. In some embodiments, EV connection interface 410 includes processing circuitry for modifying data and messages received at EV connection interface 410 to instructions for executing the shifter emulation experience by one or more of EV emulation control unit 402 (e.g., for vehicle side execution of instructions) or a shifter assembly (e.g., for shifter assembly feedback generation to provide an EV operator with a complete shifter emulation).

EV connection interface 410 includes interactive display rendering processor block 426, gear grind ratio processor block 428, resistance data profile processor block 430, graphics processor block 432, shifter controller data structure processor block 434, and shifter lever position modification processor block 436. Each of these processor block may correspond to a single set of processing circuitry, may all be part of a same set of processing circuitry, or may be considered flow chart representations of suitable data processing for providing and transmitting executable instructions or data packages the cause execution of one or more of the processes or method elements described herein. Rendering processor block 426 functions, at least in part, based on one or more of occupant input 444 received through interactive display 428. Interactive display 428 may, for example, be an OLED display on a shifter knob (e.g., shifter knob 206 of FIG. 2) or may be a form of an application display on one or more of a mobile end user device or an integrated vehicle display (e.g., a screen sensitive to vehicle occupant inputs and manipulation of elements of the screen).

Rendering processor block 426 provides at least indications that a vehicle occupant, or individual with administrative remote control of the vehicle, has provided instructions for EV emulation control unit 402 to enter an emulation profile selection mode to, for example, retrieve available emulation profiles message 420. Additionally, or alternatively, the gear pattern may not be displayed when neither appropriate vehicle occupant authentication has been provided or when the shifter assembly is not in one or more of an emulation mode or an emulation profile selection mode. Rendering processor block 426 also includes instructions for processing scrolling inputs (e.g., where available emulation profiles message 420 includes instructions for rendering for display a scrollable interface for selecting an emulation profile from a plurality of profiles) as received at interactive display 438 (e.g., which may be contingent on whether interactive display 438 includes circuitry for rendering a scrollable interface such as a horizontally oriented or vertically oriented data structure) as well as processing selection of one of the available emulation profiles corresponding to selected emulation profile 422.

Gear grind ratio processor block 428, resistance data profile processor block 430, graphics processor block 432, shifter controller data structure processor block 434, and shifter shaft position modification processor block 436 are shown as receiving transmitted data, or instructions, from EV emulation control unit 402. These transmissions are based on selected emulation profile 422 as well as inputs from vehicle network 404. Gear grind ratio processor block 428, for example, combines these data structures and transmitted elements for generating instructions to transmit to haptics grind replicator 440 to create haptic feedback via a shifter assembly to emulate gear grind based on operating condition of the EV comprising vehicle system 400A. Haptics grind replicator 440 may, for example, be part of an overall shifter assembly and may include one or more vibrating or rotatory actuators that are configured to provide haptic feedback corresponding to gear grind at a knob of a shifter assembly. As shown in FIG. 4A, haptics gear grind replicator 440 is configure to profile gear grind emulation data 442 (e.g., based on data generated or transmitted from gear grind ratio processor block 428) to shifter box 204 of FIG. 2 (e.g., where a haptic feedback actuator of a shifter assembly may be arranged). Resistance data profile processor block 430, as shown in FIG. 4A, operates in a similar manner by interfacing with variable controlled resistance processor 444 which generates shift resistance emulation data 446 also for transmission to shifter box 204 where a resistance generating actuator may be arranged for modifying, for example, an amount of force to moved shifter fork 202 through a shift pattern defined by actuated gates. In some embodiments, the gates of the shifter assembly may be selectively actuated based on shifter resistance emulation data 446 to achieve a target haptic feedback affect for a vehicle occupant interfacing with a shifter assembly in an EV. Additionally, or alternatively, graphics processor block 432 uses gear pattern graphics data structures as well as emulation identifier graphics to provide rendering criteria to OLED display 448, including gear pattern render data 450, to, for example, interactive display 122 of shifter knob 206.

Shifter assembly controller 452 is configured to both receive data and transmit data through EV connection interface 410. As shown in FIG. 4A, shifter controller data structure processor block 434 provides a shifter slot pattern, clutch engagement flag, and a slot access profile to shifter assembly controller 452 based at least in part on selected emulation profile 422 as well as any additional instructions or rendering parameters generated from or provided by EV emulation control unit 402 (e.g., based on data received from vehicle network 404). Shifter assembly controller 452 is also configured to provide slot lock instructions 454 to shifter assembly 400B of FIG. 4B in order to transmit computer readable instructions for controlling and modifying one or more operating conditions of one or more gated slots of shifter assembly 400B. Shifter lever position modification processor block 436 is shown as interfacing with shifter assembly control 452 in order to create a functional processing loop between shifter assembly 400B, EV emulation control unit 402 and vehicle network 404 to provide an immersive shifter emulation experience for a vehicle occupant.

Vehicle system 400A is also configured to provide gear grind audio 456 to audio output component 406 (e.g., based at least in part on one or more instructions or data structures provided to or received from gear grind ratio processor block 428 as processed by EV emulation control unit 402). Audio output component 406 may be any suitable speaker architecture for providing the shifter emulation experience desired in a particular EV configured to interface with shifter assembly 400B. Additionally, vehicle system 400A is shown as being able to interface with computing device 408 in order to augment, supplement, or otherwise interface with EV connection interface 410 in order to improve the instructions transmitted from EV emulation control unit 402. For example, computing device 402 may be any suitable device for improving the quality of data used to emulate a shifter in an EV based on additional or alternative data provided by computing device 408. Computing device 408 may, in some embodiments, have access to one or more servers to provide alternative or improved emulation profile data as compared to the data structures available via emulation profile storage 412.

In some embodiments, one or more of EV emulation control unit 402, computing device 408, or EV connection interface 410 incorporate processing circuitry and computer readable instructions that correspond to a gateway, or central authority, for enabling communication between, for example, vehicle network 404, shifter assembly 400B, and any components or interfaces therebetween. Vehicle system 400A involves communication between one or more of processors, modules, or processing circuitry. The data transmission therebetween, as with telecommunication hard wired or wireless networks, requires monitoring and management by a central authority or a combination encoder and decoder. This central authority become pivotal to operation of vehicle system 400A where wireless or ethernet connections involve acquiring information from remote servers or communicatively coupled devices subjected to different security protocols. The gateway of this disclosure comprises a central authority that functions as a hub for interconnecting different processors, modules, and processing circuitry throughout vehicle system 400A to enable secure and reliable transmission of data and instructions thereby in a manner that allows efficient and accurate processing upon receipt of the data and related instructions. In some embodiments, the gateway is configured to provide multiple translations (e.g., of one or more of signal names or signal addresses) between different circuitries (e.g., converting what one circuitry considered engine RPM to road wheel motor RPM with appropriate scaling of values).

In some embodiments, the gateway is configured for one or more of generating and maintaining message and data processing firewalls, converting messages and data between processors to adequately secured and encrypted data transmission, or security and authorization key management (e.g., enabling or disabling access of different modules or processors to certain information). Additionally, or alternatively, the gateway may be configured for processing both nominal and elevated bandwidth inter-processor or inter-module communication and data transfers within the vehicle. The gateway may also be configured for providing on-board diagnostics and remote monitoring of the vehicle as well as individual systems, components, or subsystems of the vehicle or interfacing with the vehicle (e.g., for generating and diagnosing trouble codes indicating issues with one or more nodes of a vehicle network or a system comprising a vehicle with an internal network). The gateway of this disclosure is capable of advanced routing for enabling efficient multiple protocol translations between different devices, components, or interfaces (e.g., EV emulation control unit 402, computing device 408, or EV connection interface 410). In some embodiments, vehicle system 400A is configured for Over-The-Air (hereinafter "OTA") software updates to the computer readable instructions and protocols used throughout the system by one or more components or subsystems of this disclosure. The gateway is configured to facilitate OTA software updates by forward appropriate batches of data, software, and messages to target destinations (e.g., one or more processors or modules).

Figure 4B:
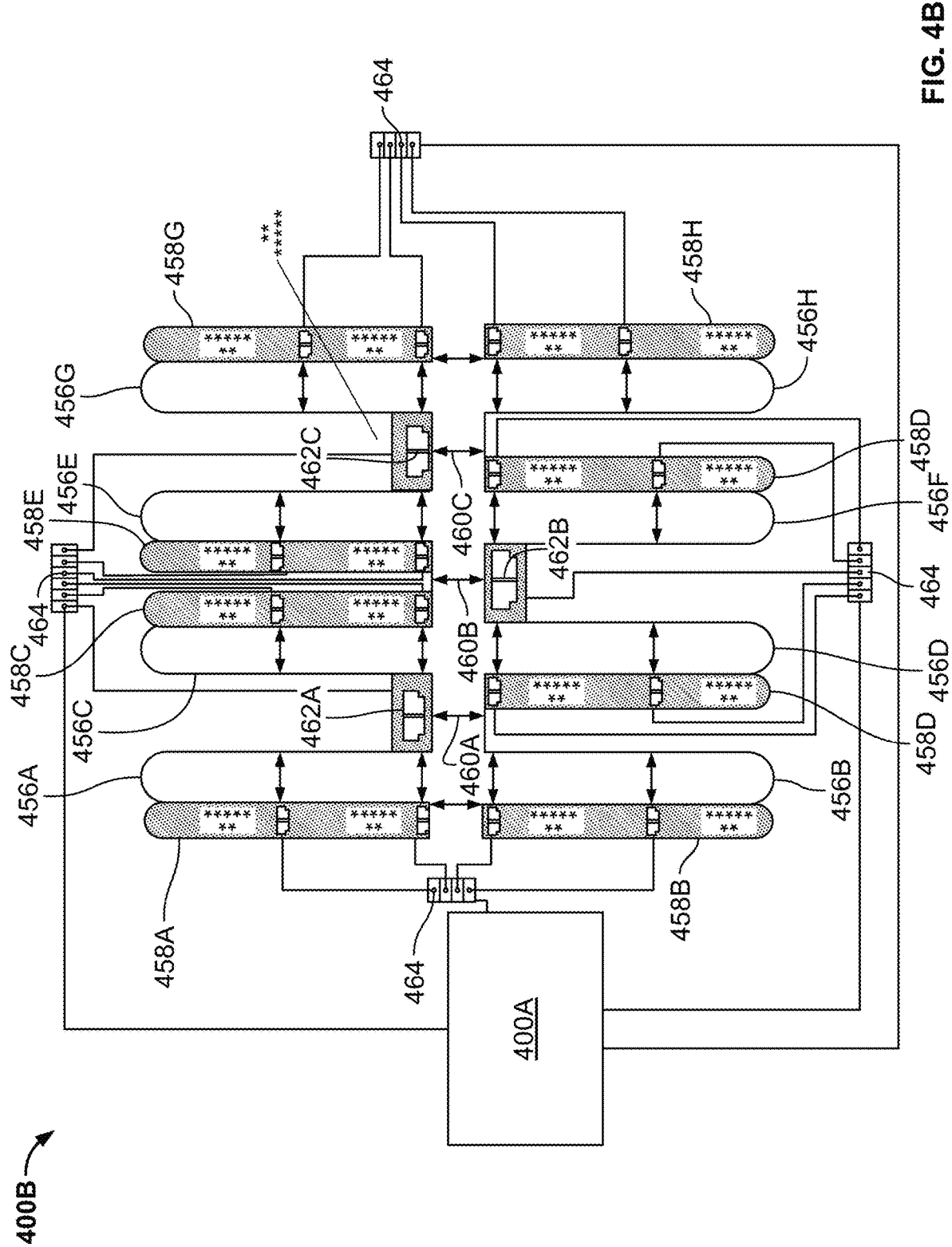
FIG. 4B depicts a gated shifter that interfaces with the vehicle system of FIG. 4A, in accordance with some embodiments of the disclosure.

FIG. 4B depicts shifter assembly 400B that interfaces with vehicle system 400A of FIG. 4A, in accordance with some embodiments of the disclosure. Shifter assembly 400B may, for example, be considered a gated shifter due to the incorporation of actuatable gates within each different shifter slot. Shifter assembly 400B may incorporate, or be incorporated into, in whole or in part into any or all of the assemblies, or subassemblies, shown in or described in reference to FIGS. 1-4A and 5-9. Additionally, or alternatively, shifter assembly 400B may be configured to execute, in whole or in part, any or all of the processes shown in or described in reference to FIGS. 10-14.

Shifter assembly 400B is an example of a gated shifter that is capable of interfacing with vehicle system 400A of FIG. 4A and which includes a plurality of lockable slots (e.g., gates) based on a gear pattern from an emulation profile. Each of gear engagement emulation slots 456A-H have a respective actuator represented by gear engagement slot blockers 458A-H. Additionally, shifter assembly 400B includes gear pair transition slots 460A-C which each have a separate respective actuator for blocking each of gear pair transition slots 460A-C and the respective actuators are represented by gear pair transition blockers 462A-C. Also shown are control nodes 464 which represent one or more processors, or processing circuitry, for receiving, transmitting, or otherwise processing data to, or from, vehicle system 400A in order to provide executable instructions to one or more of gear engagement slot blockers 458A-H or gear pair transition blockers 462A-C. Control nodes 464 may be separated based on slot and actuator pairings or may be incorporated as part of a singular processing circuitry of shifter assembly 400B. The actuators represented by the blockers of FIG. 4B provide, for example, vehicle system 400A a manner of provide haptic feedback for one or more of a partial shift into an open slot, a successfully completed shift into an open slot, a missed shift, or blocked shift (e.g., where data indicative of engine RPM does not align with other shifting criteria that in a real world shifter enabled assembly would otherwise enable a successful shift and gear engagement). One or more of gear engagement emulation slots 456A-H or gear pair transition slots 460A-C may be blocked or open based on a selected shifter emulation profile. Additionally, each actuator may be precise enough in operation to assist with certain haptic feedback criteria corresponding to vehicle performance (e.g., as represented by the various data structures and operational criteria discussed in reference to vehicle system 400A).

The actuators of shifter assembly 400B are configured to modify each position relative to respective slots in order to emulate a shift to a gear as defined by an emulation profile and as able to be replicated by the available actuators and components comprising shifter assembly 400B. For example, successful shifts or gear engagements may be emulated as well as gear grind feedback while preventing a shifter fork from moving fully into a target slotted position. In this case, if the clutch is not engaged (e.g., a clutch engagement flag is not received) a vehicle occupant interfacing with shifter assembly 400B may attempt to place a fork of shifter assembly 400B into a slot corresponding to a representative gear without the appropriate vehicle system data indicating a clutch has been properly engaged (e.g., as defined by or represented by a clutch engagement flag).

In a real world manual transmission vehicle assembly, such a shift may be attempted by a vehicle occupant and success of this shift attempt would be a function of engine RPM such that gear speeds are either matching or close enough in magnitude to enable the appropriate gear engagement. In the manual transmission vehicle assembly, the vehicle occupant would not be able to shift the vehicle into a gear without this RPM matching and the vehicle occupant would be able to feel the transmission assembly gear grind sound and vibration through, for example, the shifter lever and shifter knob. The vibration will vary based on the difference between the speed of the gears. In some embodiments, a calculation of this nature may be handled by one or more processors, processing circuitries, or processor blocks of FIG. 4A or 4B. This calculation accounts for one or more of the RPM of the engine, vehicle speed, the final drive gear ratio, or the gear ratio of the gear attempted to be shifted to, based at least in part on a selected emulation profile and data accessible via vehicle system 400A. For immersive and complete gear grind haptics emulation, a system may rely on any or all of these factors and, in some embodiments, may be configured to only provide a static vibration feedback for the missed shift (e.g., based on a particular build or configuration of shifter assembly 400B).

Further to the real world manual transmission example, a shift to engage a particular gear of the transmission assembly can be made without using the clutch (e.g., by depressing a clutch pedal to disengage a first gear and releasing the clutch pedal to engage a second gear) if the current engine RPM matches a gear ratio of the target gear slot to provide the synchronization to make the shift. Where the current engine RPM matches individual gear ratios of individual shifter slots, the gates of the corresponding slots will be actuated to provide access to the slots. Accordingly, where the current RPM of the EV matches a gear ratio of an emulation profile slot, the gates of this disclosure are actuated to expose the corresponding slot to enable an EV occupant to shift. This can be performed independent of the availability of a clutch flag that would be used to indicate an emulated clutch pedal has been depressed. Although the slots are sufficiently open to allow for the shift, an EV occupant interfacing with a shifter assembly will be able to perceive haptic feedback (e.g., notchy resistance and gear grind until the speed matches as the shifter lever is articulated into a corresponding slot). A duration of the period of time which the EV occupant experiences the haptic feedback is based on an amount of time that the engine RPM (e.g., as real time EV value or calculated value) take to get to a speed to align with the gear ratio of the target slot. This duration could be brief, transient, or any suitable amount of time based on the operating conditions of the EV (e.g., the throttle control of the EV occupant).

In some embodiments, a variable resistance system may be incorporated into one or more of vehicle system 400A and shifter assembly 400B to emulate the haptic feel of the shifter being moved. This variable resistance system may be inclusive of the various actuators of FIG. 4B, or may interface with one or more actuators of FIG. 4B. The variable resistance system may be configured to consider gear slot lockout between a manual transmission vehicle being in neutral as differentiated from an automatic transmission vehicle (e.g., based at least in part on a selected emulation profile). The resistance system will also provide the resistance feedback when attempting to move the gear into a gated slot position emulating notchy gear shift feel of a manual transmission which varies from vehicle-to-vehicle profile (e.g., as defined by data corresponding to one or more available or selected emulation profiles).

In some embodiments, the connectivity between shifter assembly 400B and vehicle system 400A may be achieved using a USB-C architecture. Any other suitable mechanical or wireless connection may be employed in place of or in parallel to the USB-C architecture in order to provide a suitable redundant connection for this vehicle system.

Figure 5:
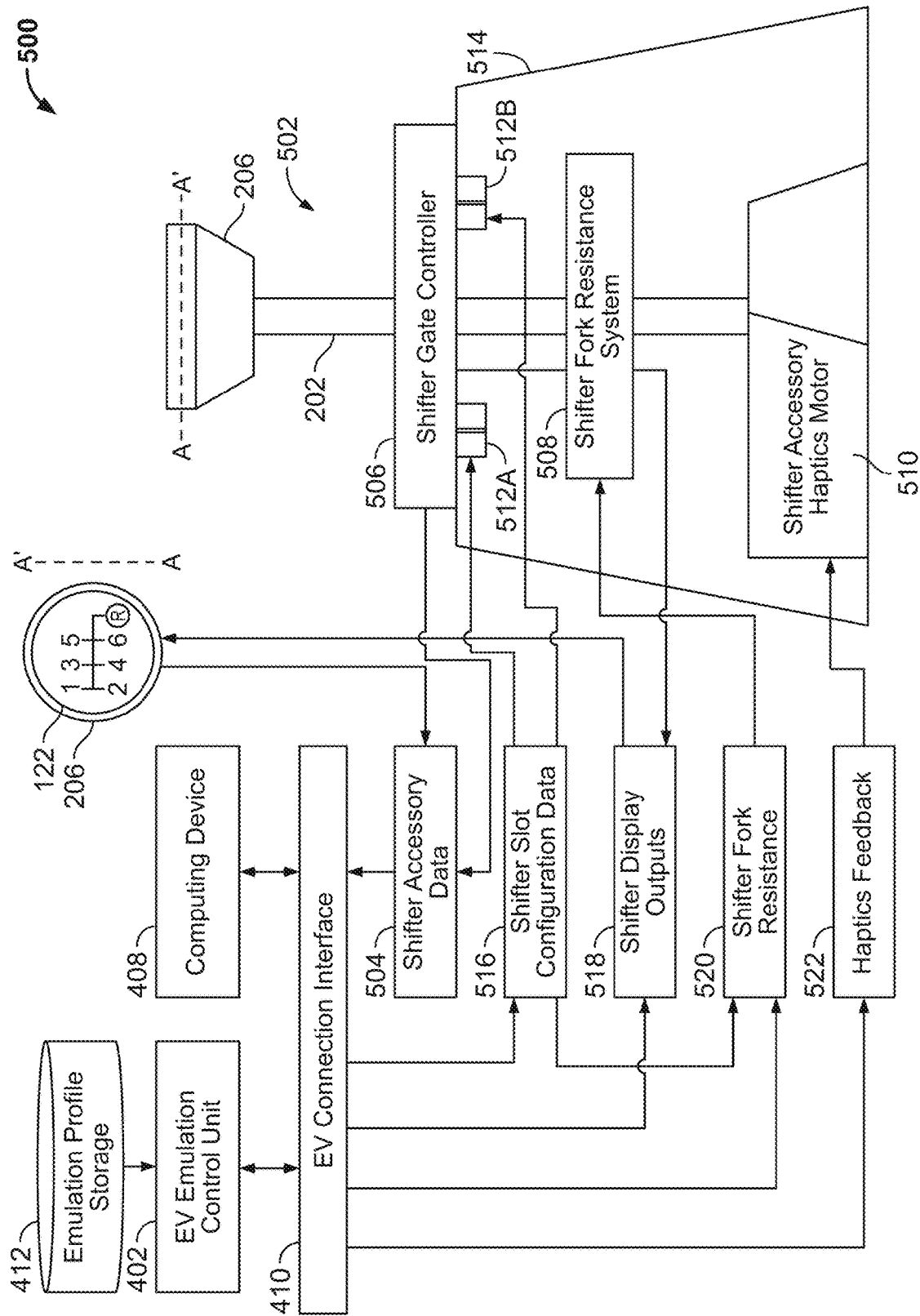
FIG. 5 depicts a side view of a shifter assembly that interfaces with a vehicle system, in accordance with some embodiments of the disclosure.

FIG. 5 depicts a side view of shifter emulation system 500 comprising a shifter assembly that interfaces with a vehicle system, in accordance with some embodiments of the disclosure. Shifter emulation system 500 may incorporate, or be incorporated into, in whole or in part into any or all of the assemblies, or subassemblies, shown in or described in reference to FIGS. 1-4B and 6-9. Additionally, or alternatively, shifter emulation system 500 may be configured to execute, in whole or in part, any or all of the processes shown in or described in reference to FIGS. 10-14.

Shifter emulation system 500 is comprised of shifter assembly 502, comprised of shifter assembly base 514, which interfaces with at least one of computing device 408 and EV emulation control unit 402 for retrieving emulation profiles from emulation profile storage 412. Shifter assembly 502 is shown in FIG. 5 in a side view orientation with cross section A-A' providing shifter knob display 122 of shifter knob 206. Shifter knob display 122 is, in some embodiments, configured to be modified based on a vehicle occupant input. For example, shifter knob display 122 may be an OLED display that reacts to hand motions related to selections of icons or scrolling instructions. These inputs to shifter knob display 122 comprise at least a portion of shifter assembly data 504 which is provided to EV connection interface 410 for processing by one or more of EV emulation control unit 402 or computing device 408. Shifter knob 206 is supported by shifter fork 202. Shifter fork 202 interfaces with shifter gate controller 506, shifter fork resistance system 508, and shifter assembly haptics motor 510. Any or all of these components may be separate subassemblies with separate processing circuitries, or, in some embodiments, one or more of shifter gate controller 506, shifter fork resistance system 508, or shifter assembly haptics motor 510 comprise integrated processing circuitry for receiving data and instructions from EV connection interface 410.

Shifter gate controller 506 is configured to provide instructions for controlling and actuating gates 512A and 512B for partially or fully blocking shifter slots (e.g., as shown in FIG. 4B) as well as exposing shifter slots (e.g., based on a selected shifter emulation profile as displayed on shifter knob display 122). Shifter slot configuration data 516 is provided to each of gates 512A and 512B (e.g., via shifter gate controller 506) based on a selected emulation profile as transmitted by EV emulation control unit 402 though EV connection interface 410. The same selected emulation profile also results in shifter display outputs 518 being transmitted to interactive display 122 of shifter knob 206. In some embodiments and as shown in FIG. 5, shifter gate controller 506 provides an additional input to shifter display outputs 518 based on one or more inputs received through shifter gate controller to clarify the availability of one or more slots (e.g., based on a selected emulation profile), including whether or not certain slots should be highlighted as being ineligible for receiving shifter for 202 (e.g., where a RPM reading does not align with a target slot and the shift is considered to be improper resulting in a need for additional resistance to be conveyed through shifter assembly 502).

Shifter fork resistance 520 corresponds to one or more instructions or data structures that profile shifter lever resistance system 508 with target values for force required for manual articulation of shifter lever 202 through various slots (e.g., based on whether actuators cause gates 512A and 512B block entirely or partially a respective slot and based on various operational conditions from an EV using shifter assembly 502 which may affect shifter articulation resistance). In some embodiments, shifter lever resistance 520 is controlled primarily by shifter fork resistance system 508 which includes actuators for modifying the amount of force required to move shifter lever 206 related to shifter assembly haptics motor 510 using shifter lever 202. In some embodiments, shifter lever resistance system 508 interfaces with shifter gate controller to collectively provide a target shift feel (e.g., corresponding to forces required to move shifter lever 202 between slots). Additionally, or alternative, shifter assembly haptics motor 510 may provide at least a portion of the force resistance and haptic feedback to be perceived through shifter knob 206 and shifter lever 202 based at least in part on haptics feedback 522 as transmitted based on instructions generated by one or more of EV emulation control unit 402 or EV connection interface (e.g., as described in reference to FIG. 4A). Shifter assembly haptics motor 510 is configured to provide one or more of rotary, vibrational, or resistive outputs to affect the articulation of shifter lever 202 through various slots based on one or more of EV operational conditions (e.g., one or more of vehicle speed, perceived vehicle gear engagement, or road wheel motor RPMs) or a selected emulation profile as display on interactive display 122.

Shifter assembly 502 is shown in FIG. 5 as a part of shifter emulation system 500 to emulate variable speed haptics gear grind. In some embodiments, one or more of shifter gate controller 506, shifter lever resistance system 508, or shifter assembly haptics motor may be provided operational instructions to emulate gear grind in an EV vehicle interfacing with shifter assembly 502. Each of these components can be arranged in any suitable position along shifter lever 202 to achieve a desired output to be perceived by a vehicle occupant interfacing with shifter assembly 502. Shifter emulation system 500 corresponds to embodiments where the resistance and haptics notchy feedback emulation as perceived through the shifter lever based on when the shifter lever would be considered to fully engage one or more gears in a real world manual transmission vehicle assembly. When all these systems are working together, this shifter assembly and system provides emulation of a manual transmission defined in transmission emulation profile. For example, one or more of these components shown in FIG. 5 are configured to provide one or more of resistance loads to emulate via the shifter assembly when the shifter assembly is manipulated between the number of shifting slots, a gear grind feedback, a drive mode of the vehicle, blocked slots, transient blocked slots based on a missed gear shift caused by manipulation of the shifter assembly, or sounds corresponding to one or more shifting activities performed via the shifter assembly.

Figure 6:
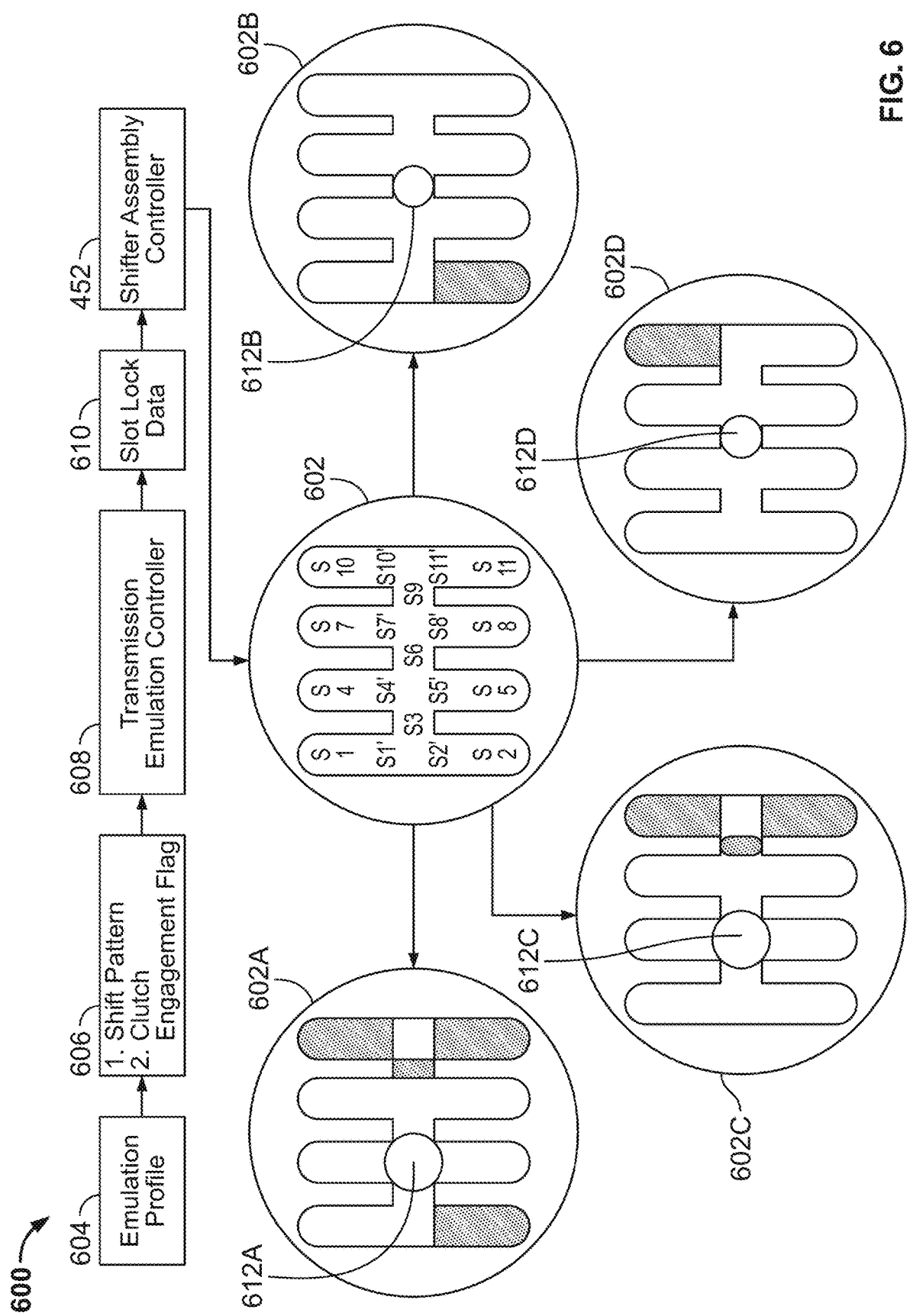
FIG. 6 depicts a plurality of gated shifter states based on a clutch status indicating a clutch is engaged, in accordance with some embodiments of the disclosure.

FIG. 6 includes data transmission blocks 600 and shows gated shifter states 602A-D of gated shifter 602 based on selected emulation profile 604 and clutch engagement flag 606 that indicates a clutch is engaged, in accordance with some embodiments of the disclosure. Gated shifter 602 may incorporate, or be incorporated into, in whole or in part into any or all of the assemblies, or subassemblies, shown in or described in reference to FIGS. 1-9. Additionally, or alternatively, gated shifter 602 may be configured to execute, in whole or in part, any or all of the processes shown in or described in reference to FIGS. 10-14.

Selected emulation profile 604 corresponds to a shifter emulation profile that has been selected as described in reference to the preceding figures. Selected emulation profile 604 results in selectively controlled slots based on gear patterns as depicted using gated shifter states 602A-D. As certain EV builds lack a physical clutch assembly for manipulating gear engagement in a transmission that is also not present in said EV builds, clutch engagement flag 606 is a data structure that is used to provide input to assemblies and components that the haptic feedback to be generated while manipulating shifter knob and fork assemblies 612A-D from the respective depicted neutral positions (e.g., unengaged with any particular emulated gear in any slot as emulated by a shifter assembly as described herein). For example, where clutch engagement flag 606 indicates a clutch is engaged, slots become unblocked for ease of manipulate of manipulating shifter knob and lever assemblies 612A-D into different slots, based on the shift pattern transmitted with clutch engagement flag 606. As shown in FIG. 6, one or more of transmission emulation controller 608 and slot lock data 610 are provided to, for example, shifter assembly controller 452 of FIG. 4A. The instructions and data structures conveyed via transmission emulation controller 608 and slot lock data 610 may be provided by any suitable architecture or arrangement for enabling slot blocking based on a selected emulation profile or select slot blocking based on vehicle operational parameters based at least in part on clutch engagement flag 606.

Where clutch engagement flag 606 indicates a clutch engaged status, then all available slots become unblocked as a function of the shift pattern. Where clutch engagement flag 606 indicates a clutch disengaged status, shifter knob and lever assemblies 612A-D may, in some embodiments, be able to only move laterally between slots S3, S6, and S9 as shown in gated shifter 602 without being able to gain access to slots S1, S2, S4, S5, S7, S8, S10, or S11. The prevention of this movement may be achieved by allowing movement up to proximal ends of each slot (e.g., closer to slots S3, S6, and S9) and using the actuators for the gates to close any or all of slots S1, S2, S4, S5, S7, S8, S10, or S11 to prevent articulating shifter knob and lever assemblies 612A-D into fully engaged positions towards distal ends of any or all of slots S1, S2, S4, S5, S7, S8, S10, or S11. For example, as shifter knob and lever assemblies 612A-D approach slot position that would, in a real world manual transmission vehicle assembly, result in gears preventing the shift or engagement, then grind haptic feedback (as described in reference to the preceding figures) will be initiated based one or more of a vibration output calculation or a force application calculation such that haptic vibration or shift resistance feedback will be felt through shifter knob and lever assemblies 612A-D by an EV vehicle occupant using one or more of the shifter accessories of this disclosure.

Gated shifter states 602A-D each correspond to different gear patterns that cause a shifter assembly to provide haptic feedback based on different iterations of selected emulation profile 604. Gated shifter state 602A can be considered representative of a four speed manual transmission shifter emulation profile where slot S1 is reserved for reverse. Slots S2 and S9-S11 are blocked regardless of the clutch engagement flag whereas slots S1, S4, S5, S7, and S8 are subjected to partial or full blockage relative to EV vehicle operational parameters as well as whether clutch engagement flag 606 provides an engaged or disengaged status. Gated shifter state 602B can be considered a six-speed manual transmission shifter emulation profile where slot S1 is also reserved for reverse. Slot S2 is blocked regardless of the clutch engagement flag whereas slots S1, S4, S5, S7, S8, S10, and S11 are subjected to partial or full blockage relative to EV vehicle operational parameters as well as whether clutch engagement flag 606 provides an engaged or disengaged status. Gated shifter state 602C can be considered a five-speed manual transmission shifter emulation profile where slot S8 is reserved for reverse. As with gated shifter state 602A, slots S2 and S9-S11 are blocked regardless of the content of clutch engagement flag 606 whereas the remaining slots are only conditionally partially or fully blocked based on parameters discussed in this disclosure. Gated shifter state 602D can be considered an alternative six speed manual transmission shifter emulation profile to gated shifter state 602B where slot S11 is reserved for reserve instead of slot S2. In this example, slot S10 is blocked regardless of the content of clutch engagement flag 606.

Figure 7:
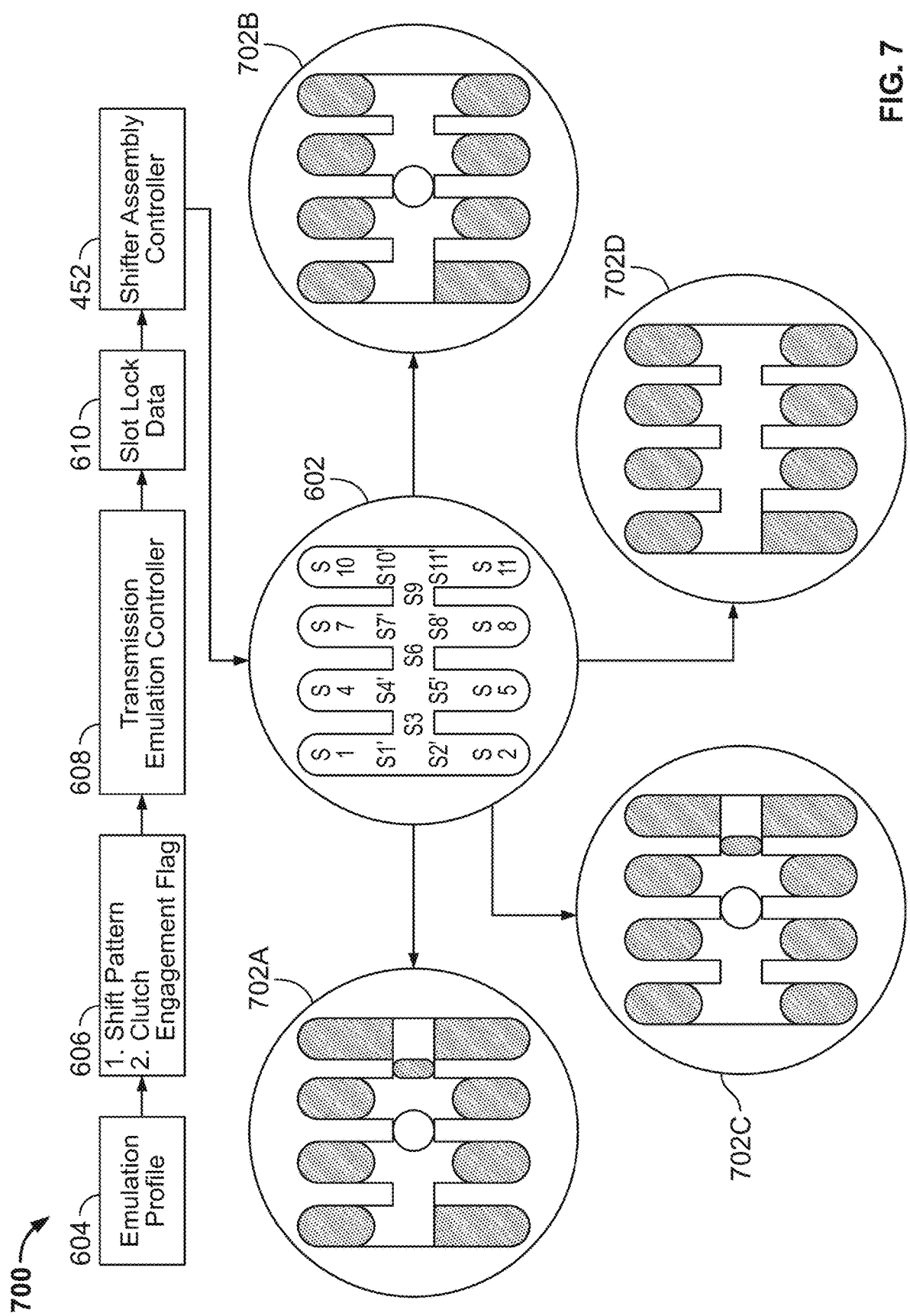
FIG. 7 depicts a plurality of gated shifter states based on a clutch status indicating a clutch is disengaged, in accordance with some embodiments of the disclosure.

FIG. 7 includes data transmission blocks 700 and shows gated shifter states 702A-D of gated shifter 602 based on selected emulation profile 604 and clutch engagement flag 606 that indicates a clutch is disengaged, in accordance with some embodiments of the disclosure. Gated shifter 602 may incorporate, or be incorporated into, in whole or in part into any or all of the assemblies, or subassemblies, shown in or described in reference to FIGS. 1-9. Additionally, or alternatively, gated shifter 602 may be configured to execute, in whole or in part, any or all of the processes shown in or described in reference to FIGS. 10-14.

Gated shifter states 702A-D each correspond to different gear patterns that cause a shifter assembly to provide haptic feedback based on different iterations of selected emulation profile 604. Gated shifter state 702A can be considered representative of a four-speed manual transmission shifter emulation profile where slot S1 is reserved for reverse. Gated shifter state 702B can be considered a six-speed manual transmission shifter emulation profile where slot S1 is also reserved for reverse. Gated shifter state 702C can be considered a five-speed manual transmission shifter emulation profile where slot S8 is reserved for reverse. Gated shifter state 702D can be considered an alternative six speed manual transmission shifter emulation profile to gated shifter state 702B where slot S11 is reserved for reserve instead of slot S2. All slots are shown as blocked based on the selected gear profile and the clutch disengage status.

Figure 8:
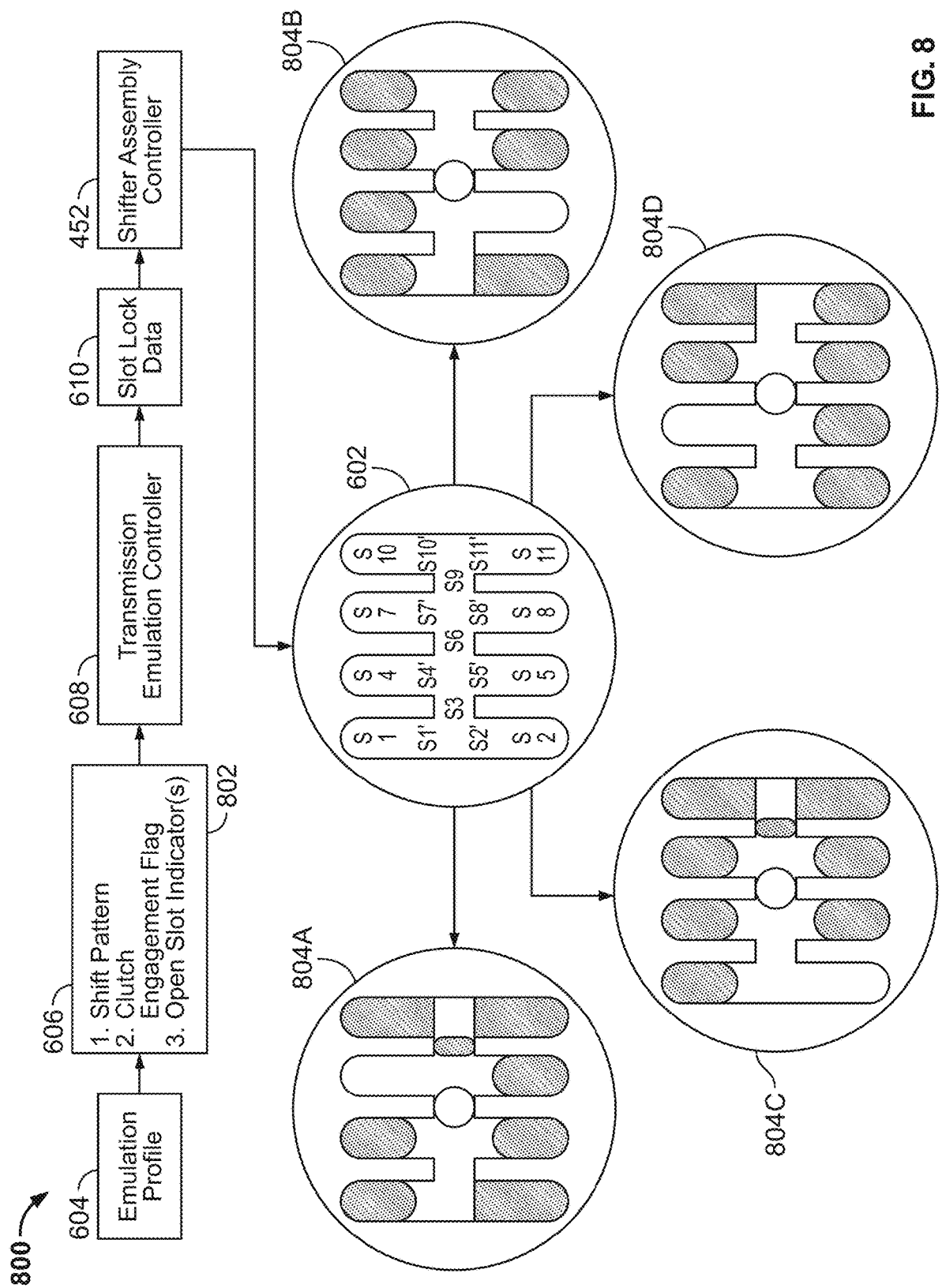
FIG. 8 depicts a plurality of gated shifter states based on a gear shifting approach based on a calculated gear speed, in accordance with some embodiments of the disclosure.

FIG. 8 includes data transmission blocks 800 and shows gated shifter states 804A-D of gated shifter 602 based on selected emulation profile 604, clutch engagement flag 606 that indicates a clutch is disengaged, and open slot indicator data structure 802 in accordance with some embodiments of the disclosure. Gated shifter 602 may incorporate, or be incorporated into, in whole or in part into any or all of the assemblies, or subassemblies, shown in or described in reference to FIGS. 1-9. Additionally, or alternatively, gated shifter 602 may be configured to execute, in whole or in part, any or all of the processes shown in or described in reference to FIGS. 10-14.

Gated shifter states 804A-D are examples of controlling the slots based on the clutch not being engaged, as indicated by clutch engagement flag 606, and operational parameters of an EV interfacing with gated shifter 602 (e.g., as exemplified by vehicle system 400A of FIG. 4A) indicate the representative RPM data provides processing circuitry enough operational context to open a slot enough, while providing adequate haptic feedback, to emulate a gear being in sync rotational speed wise with a transmission gear of a specific slot. Open slot indicator 802 of FIG. 8 is an exemplary data structure that can be dynamically updated by processing circuitry of this disclosure as a function of EV vehicle speed and the transmitted magnitude of a signal that represents engine RPM (e.g., a signal processed from an EV road wheel RPM). In some embodiments, shifting may be enabled for a time window that is relatively brief (e.g., fractions of a second). In some additional or alternative embodiments, the time window for permitting the shift into different slots can be extend based on an adjustment of EV operation such that the signal representing engine RPM conveys a magnitude that aligns a representative gear speed with a current or target vehicle speed.

Gated shifter state 802A can be considered representative of a four-speed manual transmission shifter emulation profile where slot S1 is reserved for reverse. Gated shifter state 802B can be considered a six-speed manual transmission shifter emulation profile where slot S1 is also reserved for reverse. Gated shifter state 802C can be considered a five-speed manual transmission shifter emulation profile where slot S8 is reserved for reverse. Gated shifter state 802D can be considered an alternative six speed manual transmission shifter emulation profile to gated shifter state 802B where slot S11 is reserved for reserve instead of slot S2. All slots are shown as blocked based on the selected gear profile and the clutch disengage status unless there is enough of an alignment between the magnitude of a simulated gear rotational speed and a magnitude of a signal characterizing a representative engine RPM are adequately aligned to create a window where blocked slots are transiently open for shifting despite clutch engagement flag 606 indicating a representative clutch engagement condition has been satisfied.

Figure 9:
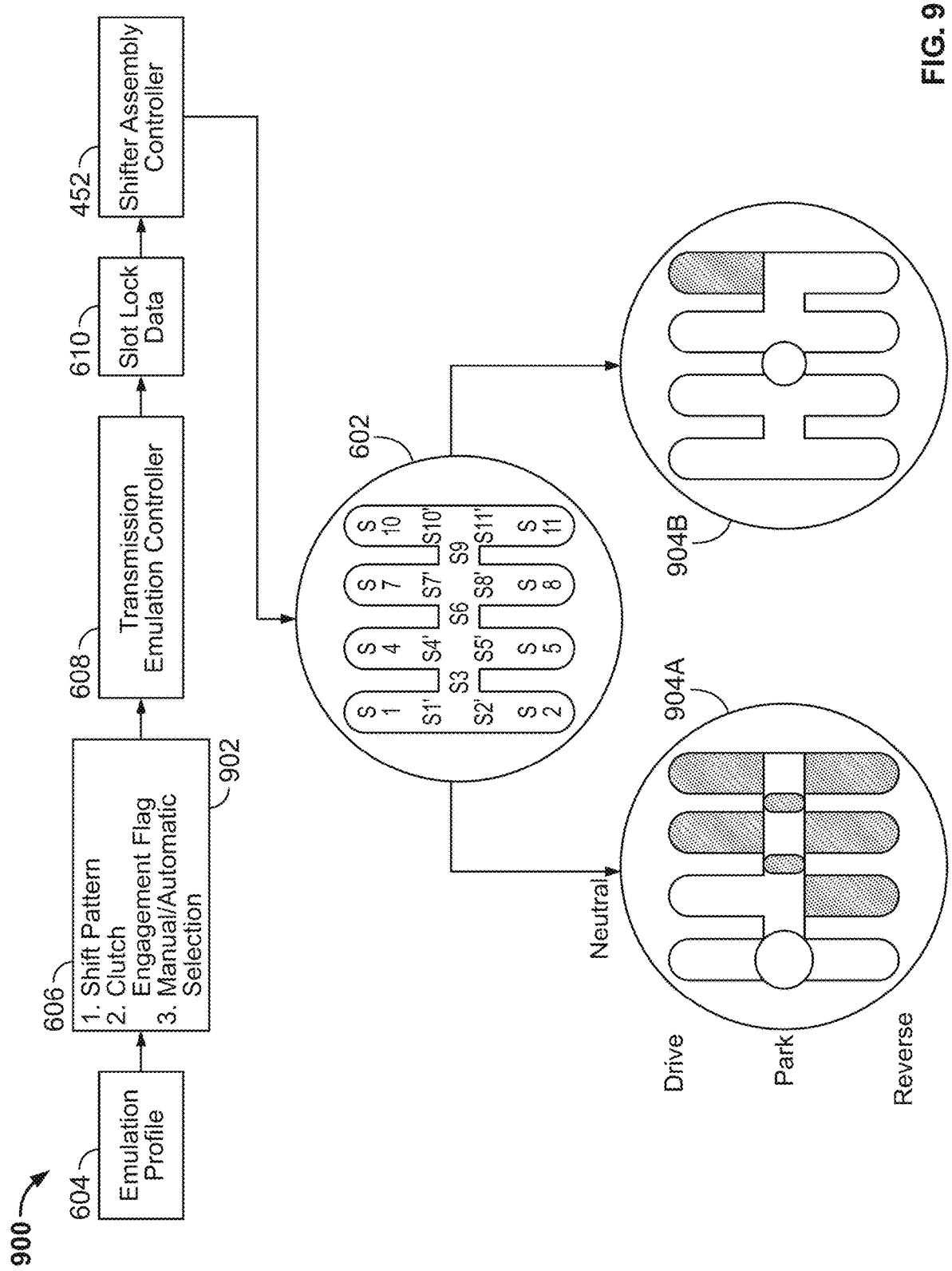
FIG. 9 depicts a gated shifter configured for automatic and manual transmission emulation, in accordance with some embodiments of the disclosure.

FIG. 9 includes data transmission blocks 900 and shows gated shifter states 904A and 904B of gated shifter 602 where selected emulation profile 604 causes emulation of an automatic transmission, in accordance with some embodiments of the disclosure. Gated shifter 602 may incorporate, or be incorporated into, in whole or in part into any or all of the assemblies, or subassemblies, shown in or described in reference to FIGS. 1-9. Additionally, or alternatively, gated shifter 602 may be configured to execute, in whole or in part, any or all of the processes shown in or described in reference to FIGS. 10-14.

Data transmission blocks 900 include manual/automatic selection 902, which is paired with clutch engagement flag 606. In some embodiments, selected emulation profile 604 includes an option to change between a manual shift layout and an automatic shift layout in gated shifter 602 without the need to modify the entire data package being used for emulation with a shifter assembly in an EV. The input corresponding to manual/automatic selection can, in some embodiments, be conveyed based on a vehicle occupant interaction with a shifter knob display or a selectable interface displayed on either a vehicle display or other end user device, such as a mobile computing device, that provides selectable options for modifying the layout of gated shifter 602 between gated shifter state 904A, corresponding to automatic transmission shift emulation, and gated shifter state 904B, corresponding to a fixed six-speed manual transmission emulation option. Although multiple gear patterns are accessible based on a selection of a manual or automatic option, only one gear pattern of the selected emulation profile is presented for causing a shifter assembly comprising gated shifter 602 to emulated corresponding shifter feedback while the alternative gear pattern is considered readily accessible depending on subsequent inputs related to manual/automatic selection 902. The use of a touch display on the shifter assembly for toggling between different transmission emulation outputs provides a more direct route for a vehicle occupant to update the experience while interfacing a shifter assembly with an EV.

Figure 10:
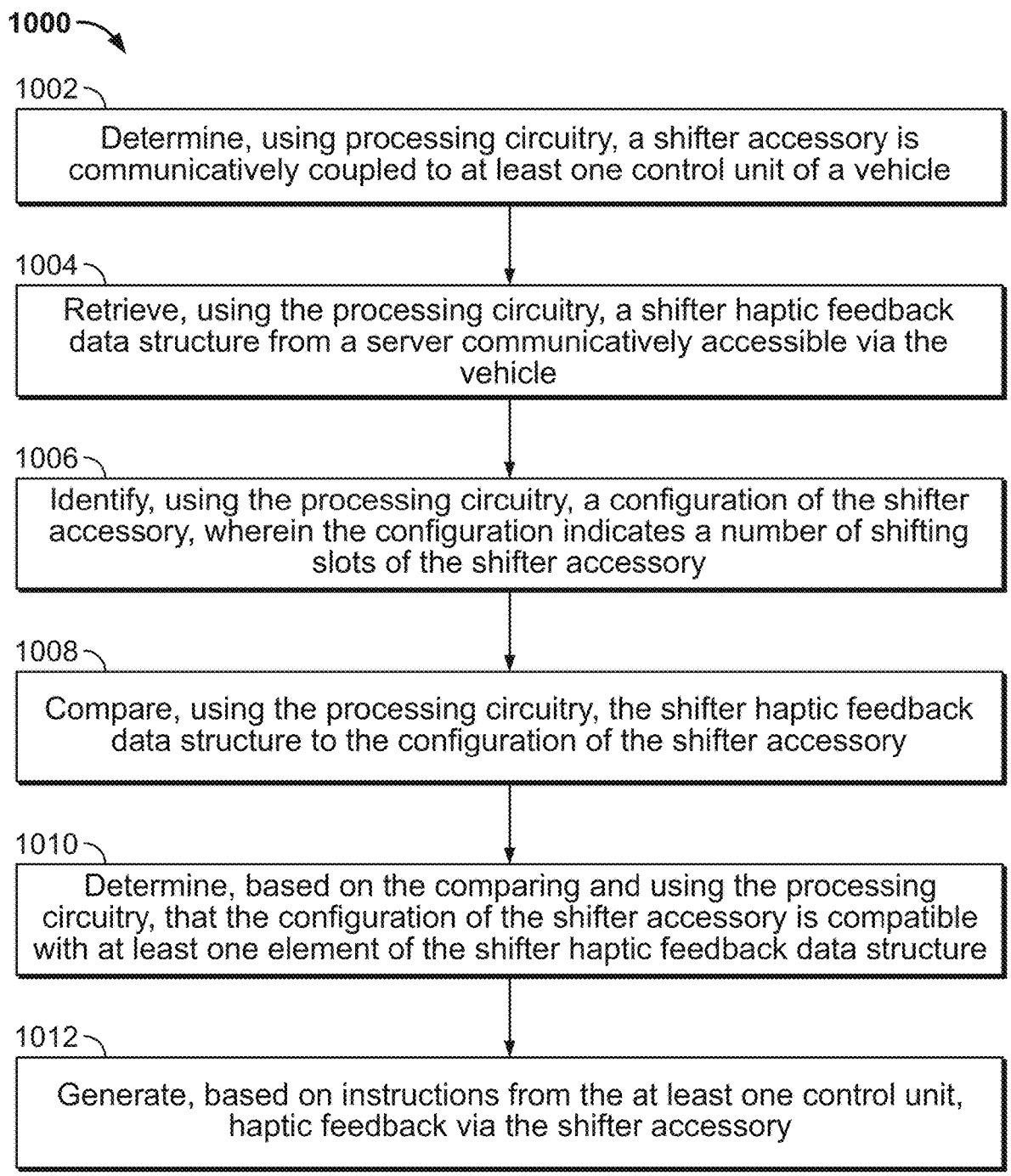
FIG. 10 is a flow chart representing an illustrative process for emulating shifter feedback using a gated shifter assembly in an EV, in accordance with some embodiments of the disclosure.

FIG. 10 is a flow chart representing process 1000 for emulating shifter feedback using a gated shifter assembly in an EV, in accordance with some embodiments of the disclosure. Process 1000 may be executed, in whole or in part, by any or all of the assemblies, systems, or components shown in or described in reference to FIGS. 1-9. Additionally, or alternatively, one or more of the process blocks of process 1000 may be executed along with one or more of the process blocks of process 1100 of FIG. 11, process 1200 of FIG. 12, process 1300 of FIG. 13, or process 1400 of FIG. 14.

At process block 1002, processing circuitry (e.g., of EV connection interface 410) is used to determine a shifter assembly is communicatively coupled to at least one control unit of a vehicle (e.g., EV emulation control unit 402). At process block 1004, the processing circuitry is used to retrieve a shifter haptic feedback data structure (e.g., one or more of the shifter emulation profiles of this disclosure) from a server communicatively accessible via the vehicle. At process block 1006, the processing circuitry identifies a configuration of the shifter assembly, wherein the configuration indicates a number of shifting slots of the shifter assembly. At process block 1008, the processing circuitry is used to compare the shifter haptic feedback data structure to the configuration of the shifter assembly. At process block 1010, the processing circuitry determines based on the comparing that the configuration of the shifter assembly is compatible with at least one element of the shifter haptic feedback data structure (e.g., there is at least one gated slot of the shifter assembly that can be utilized to emulate one or more shift slots of a selected emulation profile). At process block 1012, at least one vehicle control unit transmits instructions to generate haptic feedback via the shifter assembly. For example, the instruction can cause one or more gates of the shifter assembly to at least partially mechanically block one or more slots of the shifter assembly resulting in haptic feedback to be transmitted through a shifter knob of the shifter assembly.

Figure 11:
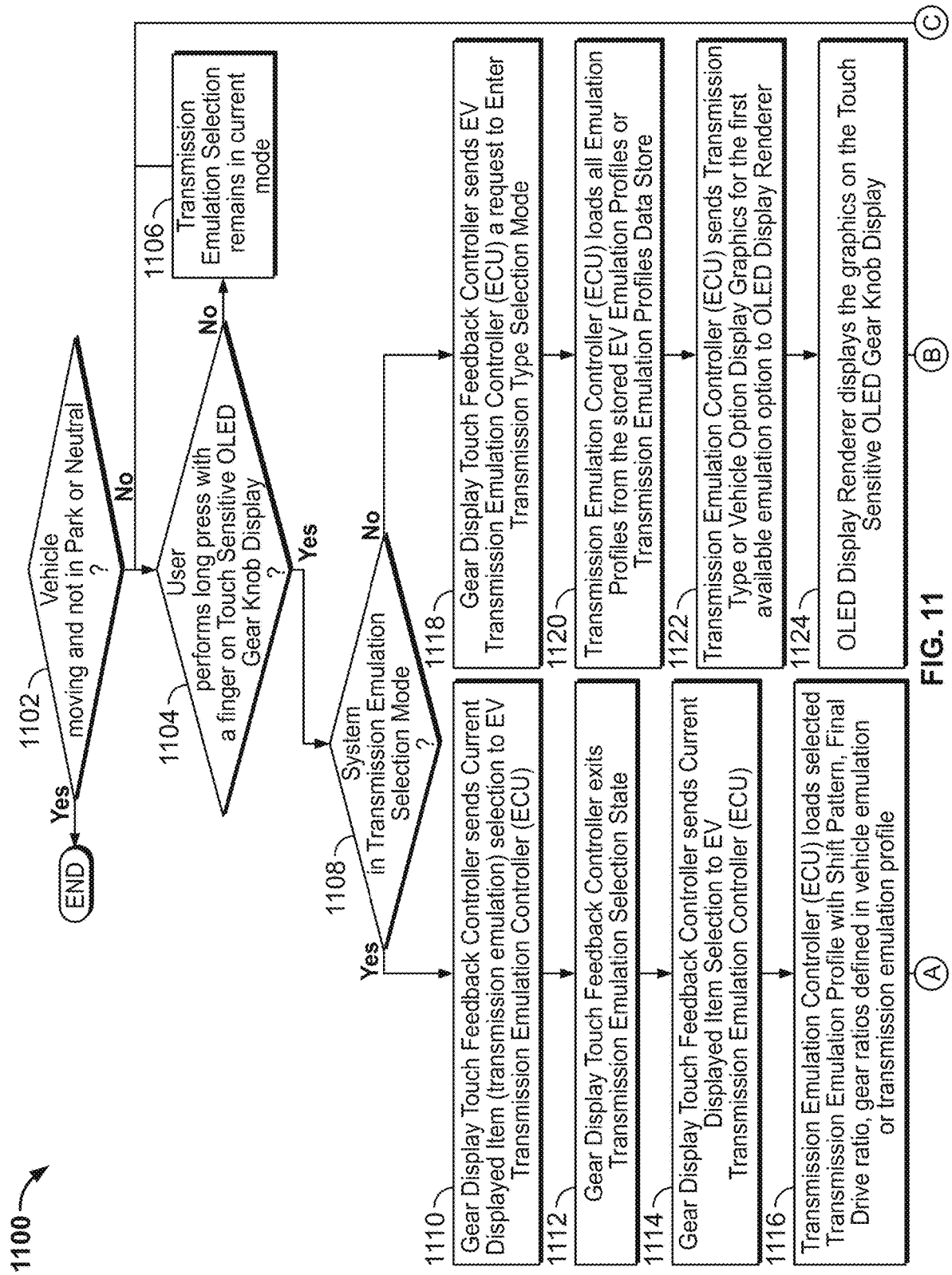
FIG. 11 is a flow chart representing an illustrative process for selecting a transmission to emulated via a shifter assembly using a display of a shifter knob, in accordance with some embodiments of the disclosure.

FIG. 11 is a flow chart representing process 1100 for selecting a transmission to emulated via a shifter assembly using a display of a shifter knob, in accordance with some embodiments of the disclosure. Process 1100 may be executed, in whole or in part, by any or all of the assemblies, systems, or components shown in or described in reference to FIGS. 1-9. Additionally, or alternatively, one or more of the process blocks of process 1000 may be executed along with one or more of the process blocks of process 1000 of FIG. 10, process 1200 of FIG. 12, process 1300 of FIG. 13, or process 1400 of FIG. 14.

At decision block 1102, processing circuitry (e.g., of EV emulation control unit 402) determines if a vehicle is moving without being in park or neutral. If it is determined the vehicle is moving without being in park or neutral (YES at 1102), then process 1100 ends. If it is determined the vehicle is moving without being in park or neutral (NO at 1102), decision block 1104 is used to determine if a user performed a long press with a finger on a touch sensitive OLED gear knob display (e.g., of the shifter accessories of this disclosure). In some embodiments, the long press with a finger can be replaced by or used in parallel with a short press of a button, an input to an application interface, or any other manual input detectable by an OLED gear knob display of this disclosure. If it is determined an inadequate input (e.g., too short in duration of a press or an insufficiently forceful press) has not been received (NO at 1104), then process block 1106 is used to maintain a current vehicle mode where the transmission emulation selection is available based on the determination at decision block 1102 (e.g., remaining available if the vehicle is not moving). If it is determined an adequate input has been received at the OLED gear knob display (YES at 1104), then decision block 1108 is used to determine if the vehicle system (e.g., vehicle system 400A) is an a transmission emulation selection mode based on one or more of a shifter assembly connection status, a determination that one or more shifter emulation profiles are readily accessible to the shifter assembly, or the transmission paths of communication between the vehicle and the shifter assembly as well as the emulation profile storage are adequately active for continuing one or more processes, or process blocks, of this disclosure.

If it is determined that the system executing process 1100 is in a transmission emulation selection mode (YES at 1108), process block 1110 facilitates a gear display touch feedback controller sending an indication that a selection of a currently displayed item (e.g., representing a particular transmission emulation profile) to an EV transmission emulation controller. At process block 1112, the gear display touch feedback controller exits the transmission emulation selection state. At process block 1114, the gear display touch feedback controller sends the displayed item selection to the EV transmission emulation controller. At process block 1116, the transmission emulation controller loads the selected transmission emulation profile with one or more of a shift pattern, a final drive ratio, one or more gear ratios defined by vehicle emulation data structures corresponding to one or more transmission emulation profiles, or one or more transmission emulation profiles. Process block 1116 also facilitates the execution of one or more process blocks of process 1300 of FIG. 13.

If it is determined that the system executing process 1100 is not in a transmission emulation selection mode (NO at 1108), process block 1118 facilitates the gear display touch feedback controller sending the EV transmission emulation controller a request to enter a transmission type selection mode. At process block 1120, the transmission emulation controller loads all emulation profiles from the store EV emulation profiles or transmission emulation profiles data store. At process block 1122, the transmission emulation controller sends one or more of a transmission type or a vehicle option display graphics rending criteria data structure for a first available emulation option to the OLDE display renderer. At process block 1124, the OLED display renderer displays the graphics on the touch sensitive OLED gear knob display.

Decision block 1126 facilitates the determination of whether a user scrolls left or right based on inputs received on an indicator or interactive interface of the touch sensitive gear knob display. If a determination is made that the user scrolled left (LEFT at 1126), process block 1128 facilitators the transmission emulation controller sending a transmission type or vehicle option display graphics rendering criteria of the previously available emulation option to the OLED display renderer. If a determination is made that the user scrolled right (RIGHT at 1126), process block 1130 facilitates the transmission emulation controller sending a transmission type or vehicle option display graphics rendering criteria corresponding to a next available emulation option to the OLED display render. Decision block 1132 facilitates determining whether a selection of an option or the provision of command to exit display of the selectable options has been received. If it is determined that an exit display input or instruction has been received (YES at 1132), process 1100 resets to monitoring for an adequate user input corresponding to decision block 1104. If it is determined that an exit display input or instruction has not been received (NO at 1132), process 1300 commences progression of process block execution based on instructions received by processing circuitry through a system configured for execution of one or more of process 1100 or process 1300.

Figure 12:
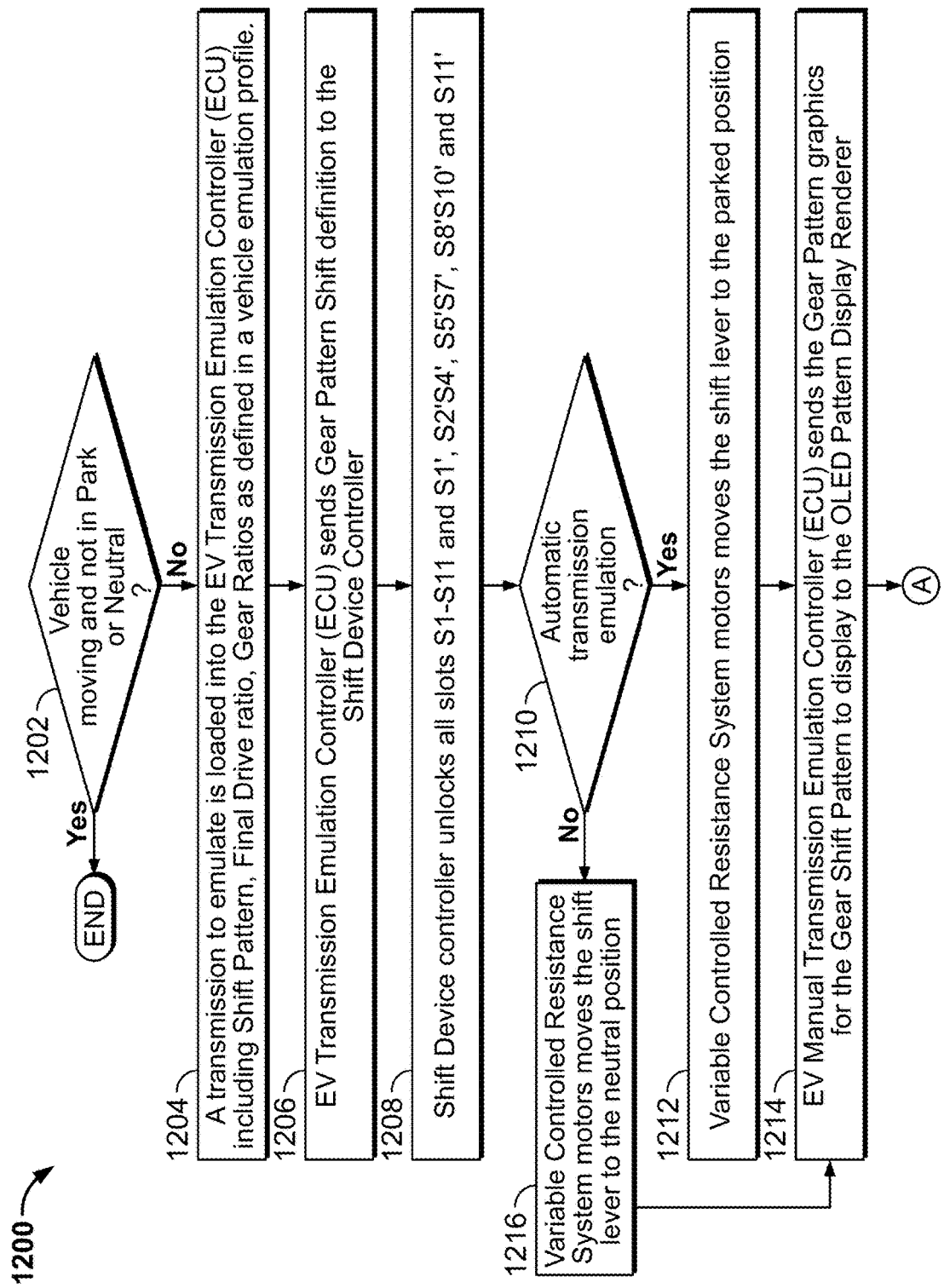
FIG. 12 is a flow chart representing an illustrative process for locking out portions of a shifter assembly based on a selected emulation data structure, in accordance with some embodiments of the disclosure.
Figure 12:
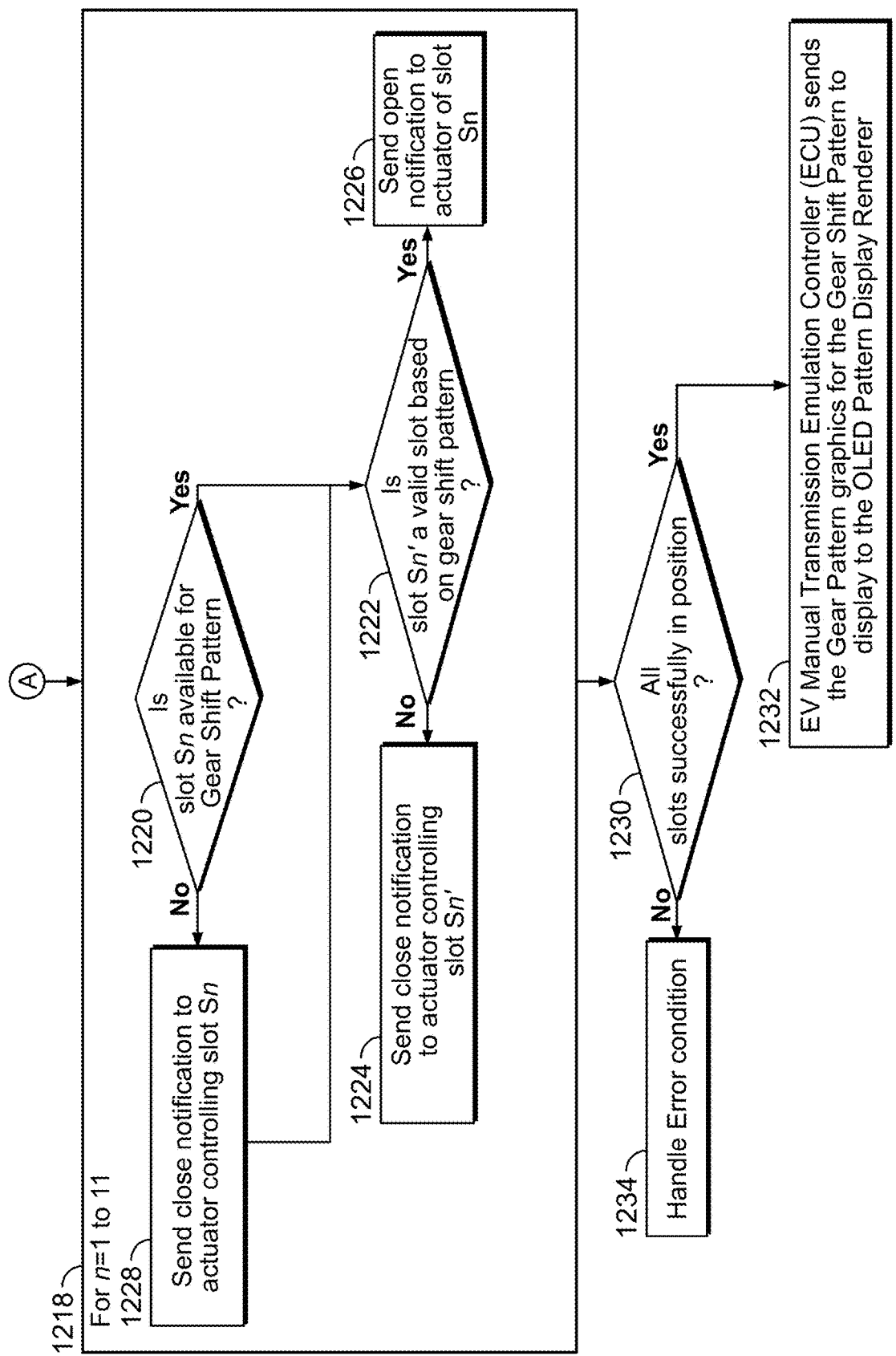

FIG. 12 is a flow chart representing process 1200 for locking out portions of a shifter assembly based on a selected emulation data structure, in accordance with some embodiments of the disclosure. Process 1200 may be executed, in whole or in part, by any or all of the assemblies, systems, or components shown in or described in reference to FIGS. 1-9. Additionally, or alternatively, one or more of the process blocks of process 1000 may be executed along with one or more of the process blocks of process 1000 of FIG. 10, process 1100 of FIG. 11, process 1300 of FIG. 13, or process 1400 of FIG. 14.

At decision block 1202, processing circuitry (e.g., of EV emulation control unit 402) determines if a vehicle is moving without being in park or neutral. If it is determined the vehicle is moving without being in park or neutral (YES at 1202), then process 1200 ends. If it is determined the vehicle is moving without being in park or neutral (NO at 1202), process block 1204 facilitates processing circuitry identifying a transmission to emulate using an EV and a shifter assembly. A transmission emulation profile is loaded into the EV transmission emulation controller and includes one or more of a shift pattern, a final drive ratio, one or more gear ratios, or other suitable parameters for an immersive emulation rendering, as defined in a vehicle emulation profile data structure. At process block 1206, the EV transmission emulation controller sends a gear pattern shift definition to the shift device controller. At process block 1208, the shift device controller unlocks all slots of the shifter assembly (e.g., S1-S11 as described herein).

Decision block 1210 facilitates one or more processing circuitries of this disclosure determining if the vehicle emulation profile is an automatic transmission emulation profile. If the selected emulation profile is configured for automatic transmission emulation (YES at 1210), process block 1212 facilitates a variable controlled resistance system motor system to move a shift lever to a parked position. At process block 1214, the EV manual transmission emulation controller sends the gear pattern graphics for the gear shift pattern to display to the OLED pattern display renderer and commences process subroutine 1218 for each controllable slot of the gear shift pattern (e.g., where the number of sub process loops is represented by n, which is an integer that is between 1 and 11, for at least one slot and up to 11 slots). If the selected emulation profile is not configured for automatic transmission emulation (YES at 1210), process block 1216 facilitates the variable control resistance system motors moving the shift lever to the neutral position and process 1200 proceeds to process block 1214 and process subroutine 1218.

Process subroutine 1218 uses decision block 1220 for determining which slots of a shifter assembly are available for the emulation of a selected transmission. For example, a selected profile may have predefined number of slots and the accessory may comprise n number of slots where n is an integer between 1 and 11. Decision block 1220 repeats from n=1 to n=11. For each n, if it is determined that the slot corresponding to the current selected value for n is available (YES at 1220), decision block 1222 facilitates processing circuitry determine if slot n is a valid slot based on the gear shift pattern of the profile. If it is determined that slot n is not a valid slot (NO at 1222), process block 1224 facilitates sending a close notification to the actuator controlling slot n. If it is determined that slot n is a valid slot (YES at 1222), process block 1226 facilitates sending an open notification to the actuator controlling slot n. For each n, if it is determined that the slot corresponding to the current selected value for n is not available (NO at 1220), process block 1228 causes a close notification to be sent to the actuator controlling slot n.

Decision block 1230 facilitates determining whether all slots are successfully in position based at least the output of process subroutine 1218. If it is determined that all slots are successfully in position (YES at decision block 1230), process block 1232 facilitates EV manual transmission emulation controller sending the gear pattern graphics for the gear shift patten to display to the OLED pattern display renderer. If it is determined that all slots are not successfully in position (NO at decision block 1230), process block 1234 facilitates handling an error condition. For example, the shifter assembly may be disabled with an error code for diagnosis. In some embodiments, the shifter assembly may access an alternative emulation profile for executing process 1200.

FIG. 13 is a flow chart representing process 1300 for emulating a change of gears in a transmission using a shifter assembly that interfaces with an EV, in accordance with some embodiments of the disclosure. Process 1300 may be executed, in whole or in part, by any or all of the assemblies, systems, or components shown in or described in reference to FIGS. 1-9. Additionally, or alternatively, one or more of the process blocks of process 1000 may be executed along with one or more of the process blocks of process 1000 of FIG. 10, process 1100 of FIG. 11, process 1200 of FIG. 12, or process 1400 of FIG. 14.

At process block 1302, processing circuitry (e.g., of emulation control unit 402) determines a selected transmission emulation profile has been loaded into an EV vehicle in operation. Decision block 1304 facilitates determining whether a vehicle is in an automatic transmission mode. If it is determined that the vehicle is in an automatic transmission mode (YES at 1304), decision block 1306 facilitates processing circuitry determining if the vehicle is moving. If it is determined that the vehicle is moving (YES at 1306), process block 1308 facilitates locking slots preventing shifting to available slot positions as defined in the shifter pattern (e.g., at least for the duration that the vehicle is moving and is in automatic transmission mode). If it is determined that the vehicle is moving (NO at 1306), decision block 1310 facilitates determining if the vehicle is in park. If it is determined that the vehicle is not in park (NO at 1310), process 1300 ends. If it is determined that the vehicle is in park (YES at 1310), decision block 1312 facilitates processing circuitry determining if the foot break is engaged. If it is determined that the foot break is engaged (YES at 1312), process block 1314 facilitates that all slot positions available defined in the automatic gear pattern are unlocked. If it is determined that the foot break is not engaged (NO at 1312), process block 1316 facilitates locking slots to preventing from shifting to available slot positions as defined in the shift pattern except for the current slot the shifter is in.

If it is determined that the vehicle is not in an automatic transmission mode (NO at 1304), process block 1318 facilitates processing circuitry of this disclosure monitoring a clutch engagement state of the vehicle. Decision block 1320 facilitates determining if a clutch state changed within a processing loop. If it is determined the clutch state did not change (NO at 1320), the monitoring of process block 1318 resumes. If it is determined the clutch state did change (YES at 1320), decision block 1322 facilitates processing circuitry determining if the clutch is engaged.

If it is determined the clutch is not engaged (NO at 1322), decision block 1324 facilitates determines if the gear or shifter lever corresponds to a gear position of neutral. If it is determined that the gear position does not correspond to neutral (NO at 1324), process block 1326 facilitates emulation of manual transmission haptic feedback in the selected gear based on one or more of the final drive gear ratio (e.g., post shift), a current gear ratio (e.g., based on a current slot), and an EV tire size as communicated from the EV to the shifter assembly. If it is determined the clutch is engaged (YES at 1322), process block 1328 facilitates unlocking all slot positions of the shifter assembly as defined in the gear pattern of the selected emulation profile (e.g., corresponding to manual transmission emulation). If it is determined the clutch is engaged (NO at 1322), decision block 1324 facilitates processing circuitry determining if the gear position is in neutral. If it is determined that the gear position is not in neutral (NO at 1324), process block 1334 facilitates emulation (e.g., via the shifter assembly) of no gear being engaged in a manual transmission and process 1300 facilitates execution of process subroutine 1336 (e.g., corresponding to process subroutine 1218 of FIG. 12). Upon the completion of process subroutine 1336 for each integer value of n (e.g., from 1 to 11), process 1300 facilitates the monitoring of the clutch engagement state via process block 1318.

Decision block 1330 facilitates determining whether a shift was attempted. If it is determined that a shifter has been attempted (YES at 1330), process 1300 activates a processing progression leading to execution of process 1400 of FIG. 14. If it is determined that a shifter has not been attempted (NO at 1330), process block 1332 facilitates emulation (e.g., via the shifter assembly) of no gear being engaged in a manual transmission and process 1300 facilitates the monitoring of the clutch engagement state via process block 1318.

FIG. 14 is a flow chart representing process 1400 for modifying an output of a shifter assembly to emulated one or more of gear grind or shift resistance, in accordance with some embodiments of the disclosure. Process 1400 may be executed, in whole or in part, by any or all of the assemblies, systems, or components shown in or described in reference to FIGS. 1-9. Additionally, or alternatively, one or more of the process blocks of process 1000 may be executed along with one or more of the process blocks of process 1000 of FIG. 10, process 1100 of FIG. 11, process 1200 of FIG. 12, or process 1300 of FIG. 13.

Process 1400 is an example method for handling gear grinds and gear shifting resistance feedback during gear shifts (e.g., when interfacing a shifter assembly with an EV). In some embodiments, shifting between slots in the shifter assembly is achieved by incorporating the following formulas into computer readable instructions for the processing circuitry of this disclosure and are usable for determining when slots will be made available when the clutch is not depressed (e.g., an active clutch engagement status or flag indicates a disengaged state). Where shifting is achievable in a real world manual transmission vehicle assembly with clutch engagement, process 1400 provides a means for achieving the same in a vehicle without a clutch assembly to engage (e.g., an EV with a shifter assembly). In manual transmissions, when the engine speed (RPM) matches the expected RPM of the engine for a particular gear, a shift may be made to that gear without using the clutch. To truly emulate a manual transmission, this disclosure offers a means of such emulation by process 1400 which provides a manner of generating gear grinds and determining if a target slot would be available (e.g., for determining whether to block or unblock a particular slot). The determination of whether a particular slot is to be made available for shifting in the shifter assembly is based at least in part on determining if there is a match of an expected RPM for the gear corresponding to the target shifter slot and the actual engine RPM (e.g., or equivalent representative EV vehicle system). Values for these computation parameters are computer, or determined, by one or more iterations of processing circuitry of this disclosure to provide an input for determining a grind rate for haptic motors or haptic actuators of the shifter assembly.

A first equation for executing process 1400 is replicated below:

$$\text{Engine } RPM = (\text{speed} \times gk \times 336)/(\text{Tire Diameter} \times G) \qquad (1)$$

The term "speed" is a real world EV speed where the magnitude of the speed is characterized by the unit of "miles per hour" (hereinafter "mph") The nomenclature "gk" is the gear ratio (e.g., corresponding to a gear ratio of a differential or road wheel rotational output motor such that there is a mechanical relationship between a size of a first rotational motion transferring component and a second rotational motion transferring component). The number 336 is a constant that converts mph to an adequately representative RPM and 336 is the number of revolutions of a tire per mile. The "Tire Diameter" is diameter of the real world EV tire in inches. The label "G" corresponds to a final drive gear ratio (e.g., when a shifter lever is in a slot fully engaged such that a real world gear mesh would be realized).

A second equation for executing process 1400 is replicated below:

$$\text{Engine } RPM = (\text{Speed} \times gk \times G \times 1000)/(\text{Tire Diameter} \times \pi) \qquad (2)$$

The term "speed" is a magnitude of the real work EV ground speed as characterized by the unit "kilometers per hour" (hereinafter "kmh"). As with the first equation, gk is the gear ratio and G is the final drive gear ratio. The number 1000 is used as a multiplier as it correlates the number of meters in a kilometer. The term "Tire Diameter" represents a real-world EV tire diameters in meters.

Process subroutine 1402 is performed based on a number, n, of slots in a shifter assembly configured to executed process 1400. Either or both of equations (1) and (2) may be utilized to compute inputs for decision block 1404. Decision block 1404 facilitates processing circuitry determining wither an unlocked slot has been occupied by a shifter fork of a shifter assembly. If it its determined that the unlocked slot is occupied (YES at 1404), process block 1406 facilitates transmission of a current gear selection based on a slot lock and gear position data structure to an EV transmission emulation controller. If it its determined that the unlocked slot is not occupied or a shift has not been completed (NO at 1404), decision block 1408 facilitates determining if only a portion of a slot is blocked or if a slot is entirely blocked. If it is determined that only a rear portion of the slot is blocked (YES at 1408), process block 1410 facilitates a variable control resistance system sending resistance based on a gear resistance profile define in a selected emulation profile while a clutch engagement flag indicates a representative clutch engaged confirmation is unavailable. At process block 1412, an EV transmission emulation controller sends gear grind rate as calculated by the transmission emulation controller for each possible gear to haptics grind controller. At process block 1414, the EV transmission emulation controller sends gear grind rate audio to a speaker output (e.g., as described in reference to FIG. 4A) and process 1400 returns to decision block 1408.

If it is determined that an entire length off the slot is blocked (NO at 1408), decision block 1416 facilitates determining if a vehicle occupant attempted a shifter motion using the shifter assembly. If it is determined that the shifter was not moved by the user (NO at 1416), process 1400 returns to decision block 1404 for determining the success of a preceding shift motion based on a current shifter fork position. If it is determined that the shifter was moved by the user (YES at 1416), process block 1418 facilitates variable controlled resistance system sending resistance based on a gear resistance profile defined in the selection emulation profile for when a gear shift occurs while the clutch engagement flag indicates a representative clutch status message corresponds to a clutch being engaged.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

While some portions of this disclosure may refer to "convention" or examples, any such reference is merely to provide context to the instant disclosure and does not form any admission as to what constitutes the state of the art.

What is claimed is:

1. A method of transmission shifting emulation in one or more of end user devices or an electric vehicle, the method comprising:
    determining, using processing circuitry, a shifter assembly is communicatively coupled to at least one control unit of a vehicle;
    retrieving, using the processing circuitry, a shifter haptic feedback data structure from a server communicatively accessible via the vehicle;
    identifying, using the processing circuitry, a configuration of the shifter assembly, wherein the configuration indicates a number of shifting slots of the shifter assembly;
    comparing, using the processing circuitry, the shifter haptic feedback data structure to the configuration of the shifter assembly;
    determining, based on the comparing and using the processing circuitry, that the configuration of the shifter assembly indicates the shifter assembly includes at least a same number of slots as the shifter haptic feedback data structure; and
    causing, based on instructions from the at least one control unit, one or more gates of the shifter assembly to at least partially mechanically block one or more slots of the shifter assembly resulting in haptic feedback to be transmitted through a shifter knob of the shifter assembly.

2. The method of claim 1, wherein:
    the shifter assembly is communicatively coupled to the at least one control unit of the vehicle via one or more of a local network or wireless communication stream; or
    the shifter assembly is mechanically coupled to a communication port of the vehicle to be communicatively coupled to the at least one control unit of the vehicle.

3. The method of claim 1, wherein each slot the shifter assembly comprises at least one respective gate of the one or more gates of the shifter assembly.

4. The method of claim 1, wherein the comparing comprises:
    determining a transmission type of the shifter haptic feedback data structure;
    identifying, based on the transmission type, a number of slots for shifting as defined in the shifter haptic feedback data structure;
    retrieving a number of slots from the configuration of the shifter assembly; and
    generating instructions for each gate of each slot of the number of slots of the shifter assembly based on the number of slots for shifting as defined in the shifter haptic feedback data structure.

5. The method of claim 1, further comprising generating audio for perception in a vehicle occupant compartment based on audio output rendering criteria retrieved from the shifter haptic feedback data structure.

6. The method of claim 1, further comprising:
    monitoring a vehicle network for a clutch engagement status;
    in response to determining there is one or more of a lack of the clutch engagement status or a clutch engagement status corresponding to a clutch being disengaged, determining a current engine revolutions per minute (RPMs) for the vehicle;
    comparing the current RPMs to a respective gear ratio of each shifter pattern slot and a final gear ratio of each shifter pattern slot of the shifter haptic feedback data structure; and in response to determining the current RPMs match a respective gear ratio and a respective final gear ratio of a respective shifter pattern slot, generating instructions to cause a gate of the shifter assembly corresponding to the respective shifter pattern slot to open a corresponding shifter slot of the shifter assembly.

7. The method of claim 1, further comprising:
determining the vehicle is not moving;
receiving a first input at an interactive display of the shifter assembly to modify the vehicle state to an emulation profile selection mode; and
receiving a second input corresponding to selection of at least one shifter haptic feedback data structure.

8. The method of claim 1, further comprising one or more of:
causing a display of the shifter assembly to provide a readout of a replicated gear pattern;
causing one or more of the display of the shifter assembly or an interface of the vehicle to provide a biometric interface for accessing settings corresponding to the shifter assembly; or
causing the at least one control unit to identify one or more vehicle occupants.

9. The method of claim 8, further comprising causing the display to generate an updated shifter location within a rendered gear pattern based on a proximity of a hand to the display of the shifter assembly.

10. The method of claim 1, wherein the instructions from the at least one control unit are generated based on one or more of a current vehicle operating state, motion detected within a passenger compartment of the vehicle, or haptic feedback capabilities of the shifter assembly.

11. A system comprising:
a data store;
a vehicle comprising at least one control unit communicatively coupled to the data store;
processing circuitry communicatively coupled to the vehicle, wherein the processing circuitry is configured to:
determine a shifter assembly is communicatively coupled to the at least one control unit of the vehicle;
retrieve a shifter haptic feedback data structure from the data store;
identify a configuration of the shifter assembly, wherein the configuration indicates a number of shifting slots of the shifter assembly;
compare the shifter haptic feedback data structure to the configuration of the shifter assembly;
determine, based on the comparing, that the configuration of the shifter assembly indicates the shifter assembly includes at least a same number of slots as the shifter haptic feedback data structure; and
cause, based on instructions from the at least one control unit, one or more gates of the shifter assembly to at least partially mechanically block one or more slots of the shifter assembly resulting in haptic feedback to be transmitted through a shifter knob of the shifter assembly.

12. The system of claim 11, wherein:
the shifter assembly is communicatively coupled to the at least one control unit of the vehicle via one or more of a local network or wireless communication stream; or
the shifter assembly is mechanically coupled to a communication port of the vehicle to be communicatively coupled to the at least one control unit of the vehicle.

13. The system of claim 11, wherein each slot the shifter assembly comprises at least one respective gate of the one or more gates of the shifter assembly.

14. The system of claim 11, wherein the processing circuitry configured to execute the comparing is further configured to:
determine a transmission type of the shifter haptic feedback data structure;
identify, based on the transmission type, a number of slots for shifting as defined in the shifter haptic feedback data structure;
retrieve a number of slots from the configuration of the shifter assembly; and
generate instructions for each gate of each slot of the number of slots of the shifter assembly based on the number of slots for shifting as defined in the shifter haptic feedback data structure.

15. The system of claim 11, wherein the processing circuitry is further configured to generate audio for perception in a vehicle occupant compartment based on audio output rendering criteria retrieved from the shifter haptic feedback data structure.

16. The system of claim 11, wherein the processing circuitry is further configured to:
monitor a vehicle network for a clutch engagement status;
in response to determining there is one or more of a lack of the clutch engagement status or a clutch engagement status corresponding to a clutch being disengaged, determine a current engine revolutions per minute (RPMs) for the vehicle;
compare the current RPMs to a respective gear ratio of each shifter pattern slot and a final gear ratio of each shifter pattern slot of the shifter haptic feedback data structure; and
in response to determining the current RPMs match a respective gear ratio and a respective final gear ratio of a respective shifter pattern slot, generate instructions to cause a gate of the shifter assembly corresponding to the respective shifter pattern slot to open a corresponding shifter slot of the shifter assembly.

17. The system of claim 11, wherein the processing circuitry is further configured to:
determine the vehicle is not moving;
receive a first input at an interactive display of the shifter assembly to modify the vehicle state to an emulation profile selection mode; and
receive a second input corresponding to selection of at least one shifter haptic feedback data structure.

18. The system of claim 11, wherein the processing circuitry is further configured to execute one or more of:
cause a display of the shifter assembly to provide a readout of a replicated gear pattern;
cause one or more of the display of the shifter assembly or an interface of the vehicle to provide a biometric interface for accessing settings corresponding to the shifter assembly; or
cause the at least one control unit to identify one or more vehicle occupants.

19. The system of claim 18, wherein the processing circuitry is further configured to cause the display to generate an updated shifter location within a rendered gear pattern based on a proximity of a hand to the display of the shifter assembly.

20. The system of claim 11, wherein the instructions from the at least one control unit are generated based on one or more of a current vehicle operating state, motion detected within a passenger compartment of the vehicle, or haptic feedback capabilities of the shifter assembly.

\* \* \* \* \*